(12) United States Patent
Otani et al.

(10) Patent No.: US 7,995,308 B2
(45) Date of Patent: Aug. 9, 2011

(54) MAGNETIC HEAD FOR PERPENDICULAR MAGNETIC RECORDING AND METHOD OF MANUFACTURING SAME, THE MAGNETIC HEAD INCUDING POLE LAYER AND TWO SHIELDS SANDWICHING THE POLE LAYER

(75) Inventors: Koichi Otani, Tokyo (JP); Naoto Matono, Hong Kong (CN); Tatsuya Harada, Tokyo (JP); Kenji Yokoyama, Tokyo (JP); Hidetaka Kawano, Tokyo (JP)

(73) Assignees: TDK Corporation, Tokyo (JP); SAE Magnetics (H.K.) Ltd., Hong Kong (CN)

( * ) Notice: Subject to any disclaimer, the term of this patent is extended or adjusted under 35 U.S.C. 154(b) by 1046 days.

(21) Appl. No.: 11/783,232

(22) Filed: Apr. 6, 2007

(65) Prior Publication Data

US 2008/0247087 A1    Oct. 9, 2008

(51) Int. Cl.
*G11B 5/31* (2006.01)
(52) U.S. Cl. ............ 360/125.17; 29/603.15; 360/125.22
(58) Field of Classification Search ............. 360/125.02, 360/125.04, 319, 317, 123.12, 122, 128, 360/125.17, 125.22, 125.24, 125.25
See application file for complete search history.

(56) References Cited

U.S. PATENT DOCUMENTS

| 6,728,065 | B2 * | 4/2004 | Batra et al. ............... 360/125.03 |
| 6,842,308 | B1 | 1/2005 | Pust et al. |
| 6,954,340 | B2 * | 10/2005 | Shukh et al. .................. 360/317 |
| 6,989,963 | B2 | 1/2006 | Kautzky et al. |
| 7,042,682 | B2 | 5/2006 | Hu et al. |
| 7,126,788 | B1 | 10/2006 | Liu et al. |
| 7,126,790 | B1 | 10/2006 | Liu et al. |
| 2004/0201918 | A1 * | 10/2004 | Guan et al. ..................... 360/125 |
| 2004/0252410 | A1 * | 12/2004 | Hsu et al. ....................... 360/126 |
| 2005/0068671 | A1 * | 3/2005 | Hsu et al. ....................... 360/125 |
| 2005/0128637 | A1 * | 6/2005 | Johnston et al. ............... 360/125 |
| 2005/0237665 | A1 | 10/2005 | Guan et al. |
| 2006/0203384 | A1 | 9/2006 | Maruyama et al. |

FOREIGN PATENT DOCUMENTS

| JP | A 2005-122887 | 5/2005 |
| JP | A 2005-310363 | 11/2005 |
| JP | A 2006-252620 | 9/2006 |

* cited by examiner

*Primary Examiner* — Craig A. Renner
*Assistant Examiner* — Tamara Ashford
(74) *Attorney, Agent, or Firm* — Oliff & Berridge, PLC

(57) ABSTRACT

A magnetic head incorporates: a medium facing surface; a coil; a pole layer; first and second shields disposed to sandwich the pole layer therebetween; a first gap layer disposed between the first shield and the pole layer; a second gap layer disposed between the second shield and the pole layer; and a substrate. The first shield is located closer to the substrate than the second shield. The first shield has a first layer and a second layer disposed between the first layer and the first gap layer.

13 Claims, 19 Drawing Sheets

MAGNETIC HEAD FOR PERPENDICULAR MAGNETIC RECORDING AND METHOD OF MANUFACTURING SAME, THE MAGNETIC HEAD INCUDING POLE LAYER AND TWO SHIELDS SANDWICHING THE POLE LAYER

BACKGROUND OF THE INVENTION

1. Field of the Invention

The present invention relates to a magnetic head for perpendicular magnetic recording that is used for writing data on a recording medium by means of a perpendicular magnetic recording system and a method of manufacturing such a magnetic head, and to a head assembly and a hard disk drive each of which includes the magnetic head for perpendicular magnetic recording.

2. Description of the Related Art

For magnetic read/write devices such as magnetic disk drives, higher recording density has been constantly required to achieve a higher storage capacity and smaller dimensions. Typically, magnetic heads used in magnetic read/write devices are those having a structure in which a reproducing (read) head having a magnetoresistive element (that may be hereinafter called an MR element) for reading and a recording (write) head having an induction-type electromagnetic transducer for writing are stacked on a substrate.

Write heads include those of a longitudinal magnetic recording system wherein signals are magnetized in the direction along the surface of the recording medium (the longitudinal direction) and those of a perpendicular magnetic recording system wherein signals are magnetized in the direction perpendicular to the surface of the recording medium. Recently, the shift from the longitudinal magnetic recording system to the perpendicular magnetic recording system has been promoted in order to achieve higher recording density of magnetic read/write devices.

The write head for the perpendicular magnetic recording system incorporates a coil for generating a magnetic field corresponding to data to be written on a recording medium, and a pole layer for allowing a magnetic flux corresponding to the magnetic field generated by the coil to pass therethrough and generating a write magnetic field for writing the data on the recording medium. The pole layer has an end face located in a medium facing surface, and the width of the end face defines the track width.

As one of magnetic heads for perpendicular magnetic recording, a magnetic head incorporating first and second shields disposed to sandwich a pole layer in between is known, as disclosed in U.S. Pat. No. 7,126,788 B1, U.S. Patent Application Publication 2005/0237665 A1, and U.S. Patent Application Publication 2006/0203384 A1, for example. In this magnetic head, at the medium facing surface, the end face of the first shield is located backward of the end face of the pole layer along the direction of travel of the recording medium with a specific distance provided therebetween. The end face of the second shield is located forward of the end face of the pole layer along the direction of travel of the recording medium with a specific distance provided therebetween. The first and second shields have a function of preventing a magnetic flux from reaching the recording medium, the flux having been generated from the end face of the pole layer and expanding in directions except the direction orthogonal to the surface of the recording medium. The magnetic head incorporating such first and second shields makes it possible to achieve a further improvement in recording density.

Consideration will now be given to a method of forming a first shield of a magnetic head in which the first shield is located closer to the substrate than the second shield. As such a magnetic head, one having a structure in which the first shield is disposed on a magnetic layer disposed to sandwich a coil between itself and the pole layer, as disclosed in U.S. Patent Application Publication 2005/0237665 A1 or U.S. Patent Application Publication 2006/0252620 A1, for example. The first shield of the magnetic head having such a structure is formed by frame plating, for example. In this method, a photoresist layer is first formed on the magnetic layer, and the photoresist layer is patterned by photolithography to form a frame. The frame has a groove having a shape corresponding to the shape of the first shield to be formed. Next, the first shield is formed by plating in the groove of the frame.

The shape of the first shield has influences on write characteristics. For example, the length of the top surface of the first shield opposed to the pole layer taken in the direction orthogonal to the medium facing surface has influences on the capability of a function of the first shield, that is, a function of taking in a magnetic flux generated from the end face of the pole layer and expanding in directions other than the direction orthogonal to the surface of the recording medium. It is therefore required to control the shape of the first shield with precision.

The thickness of the first shield is defined by factors such as the distance between the read head and the write head determined in accordance with the specifications of the magnetic read/write apparatus, or the distance between the magnetic layer and the pole layer required for placing components other than the first shield, such as a coil, in the region between the magnetic layer and the pole layer where the first shield is disposed.

To form the first shield having a desired thickness by frame plating, it is required to form a frame thicker than the first shield. Since this frame is formed by photolithography, it becomes harder to form the groove of the frame with precision as the thickness of the frame is increased. Therefore, the thicker the frame, the harder it becomes to control the shape of the first shield with precision.

OBJECT AND SUMMARY OF THE INVENTION

It is an object of the invention to provide a magnetic head for perpendicular magnetic recording that is capable of precisely controlling the shape of a shield having an end face located in a medium facing surface at a position backward of an end face of a pole layer along the direction of travel of a recording medium, and a method of manufacturing such a magnetic head, and to a head assembly and a magnetic disk drive each of which incorporates the magnetic head for perpendicular magnetic recording.

A first or second magnetic head for perpendicular magnetic recording of the invention includes: a medium facing surface that faces toward a recording medium; a coil that generates a magnetic field corresponding to data to be written on the recording medium; a pole layer that has an end face located in the medium facing surface, allows a magnetic flux corresponding to the magnetic field generated by the coil to pass therethrough and generates a write magnetic field for writing the data on the recording medium by means of a perpendicular magnetic recording system; a first shield made of a magnetic material and having an end face located in the medium facing surface at a position backward of the end face of the pole layer along a direction of travel of the recording medium; a first gap layer made of a nonmagnetic material and having an end face located in the medium facing surface, the first gap layer being disposed between the first shield and the pole layer; a magnetic layer connected to the first shield and disposed at such a position that the first shield is sandwiched between the magnetic layer and the pole layer; a second shield made of a magnetic material and having an end face located in the medium facing surface at a position forward of the end face of the pole layer along the direction of travel of the recording medium; a second gap layer made of a nonmagnetic material and having an end face located in the medium facing surface, the second gap layer being disposed between the second shield and the pole layer; and a substrate on which the coil, the pole layer, the magnetic layer, the first and second shields, and the first and second gap layers are stacked.

In the first or second magnetic head of the invention, the first shield is located closer to the substrate than the second shield.

In the first magnetic head of the invention, the first shield includes a first layer, and a second layer that is disposed between the first layer and the first gap layer. The length of the second layer taken in the direction orthogonal to the medium facing surface may be smaller than the length of the first layer taken in the direction orthogonal to the medium facing surface.

In the second magnetic head of the invention, the first shield includes a first portion, and a second portion that is disposed between the first portion and the first gap layer, and the length of the second portion taken in the direction orthogonal to the medium facing surface is smaller than the length of the first portion taken in the direction orthogonal to the medium facing surface.

In the first or second magnetic head of the invention, the second shield may be connected to the pole layer at a position away from the medium facing surface, and the coil may include a portion that passes through a space surrounded by the pole layer and the second shield. The coil may further include a portion that passes through a space between the magnetic layer and the pole layer.

A first or second head assembly of the invention incorporates: a slider including the first or second magnetic head of the invention and disposed to face toward a recording medium; and a supporter flexibly supporting the slider.

A first or second magnetic disk drive of the invention incorporates: a slider including the first or second magnetic head of the invention and disposed to face toward a recording medium that is driven to rotate; and an alignment device supporting the slider and aligning the slider with respect to the recording medium.

A magnetic head for perpendicular magnetic recording manufactured through a first or second manufacturing method of the invention includes a medium facing surface, a coil, a pole layer, a magnetic layer, first and second shields, and first and second gap layers. In the magnetic head manufactured through the first manufacturing method of the invention, the first shield includes a first layer, and a second layer that is disposed between the first layer and the first gap layer. In the magnetic head manufactured through the second manufacturing method of the invention, the first shield includes a first portion, and a second portion that is disposed between the first portion and the first gap layer. The length of the second portion taken in the direction orthogonal to the medium facing surface is smaller than the length of the first portion taken in the direction orthogonal to the medium facing surface.

The first or second manufacturing method for the magnetic head of the invention includes the steps of forming the magnetic layer; forming the first shield after the magnetic layer is formed; forming the first gap layer after the first shield is formed; forming the pole layer after the first gap layer is formed; forming the second gap layer after the pole layer is formed; forming the second shield after the second gap layer is formed; and forming the coil.

In the first manufacturing method for the magnetic head of the invention, the step of forming the first shield includes the step of forming the first layer and the step of forming the second layer on the first layer by frame plating.

In the second manufacturing method for the magnetic head of the invention, the step of forming the first shield includes the steps of: forming a layer for shield that is to become the first shield later by undergoing partial etching; and forming the first and second portions by partially etching the layer for shield.

According to the first magnetic head of the invention or the method of manufacturing the same, or the head assembly or the magnetic disk drive incorporating the first magnetic head, since the first shield includes the first layer and the second layer, it is possible to form the first shield with higher precision, compared with a case in which the entire first shield is made up of a single layer. As a result, it is possible to control the shape of the first shield with precision.

According to the second magnetic head of the invention or the method of manufacturing the same, or the head assembly or the magnetic disk drive incorporating the second magnetic head, since the first shield includes the first portion and the second portion and the length of the second portion taken in the direction orthogonal to the medium facing surface is smaller than the length of the first portion taken in the direction orthogonal to the medium facing surface, it is possible to control the shape of the first shield with precision.

Other and further objects, features and advantages of the invention will appear more fully from the following description.

DETAILED DESCRIPTION OF THE PREFERRED EMBODIMENTS

First Embodiment

Figure 1:
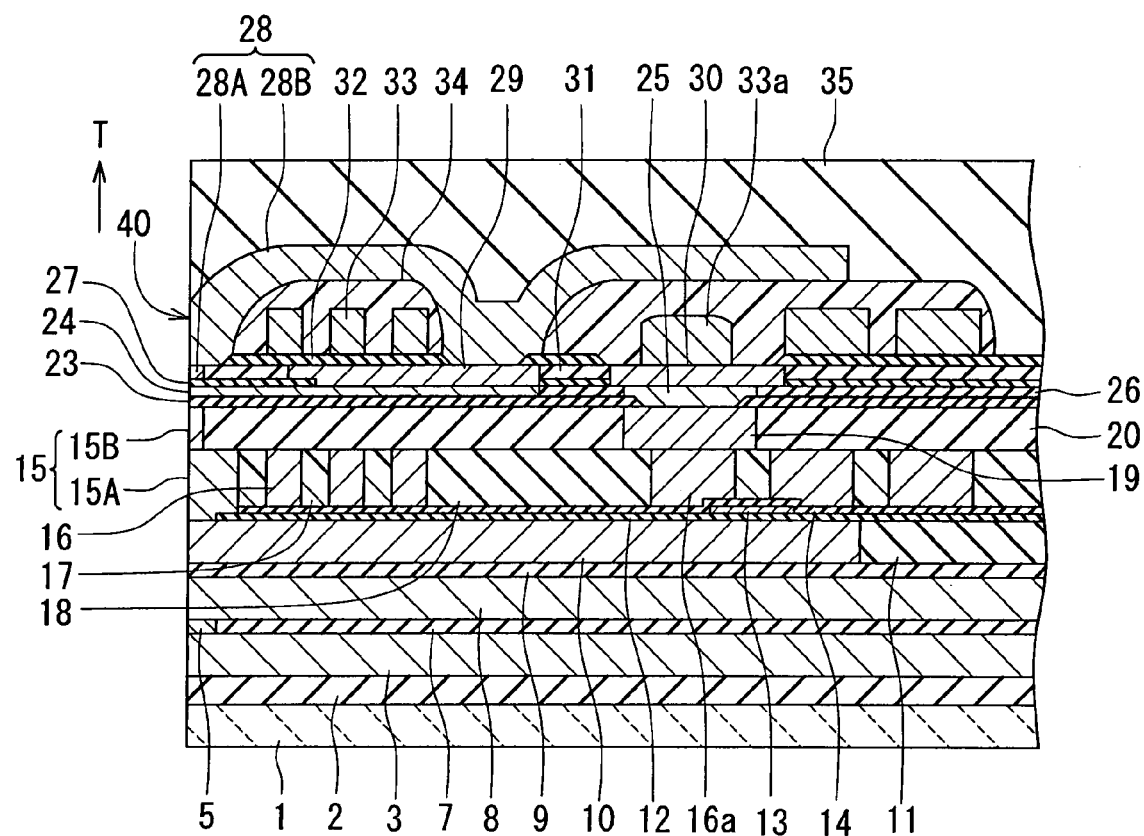
FIG. 1 is a cross-sectional view for illustrating the configuration of a magnetic head of a first embodiment of the invention.
Figure 2:
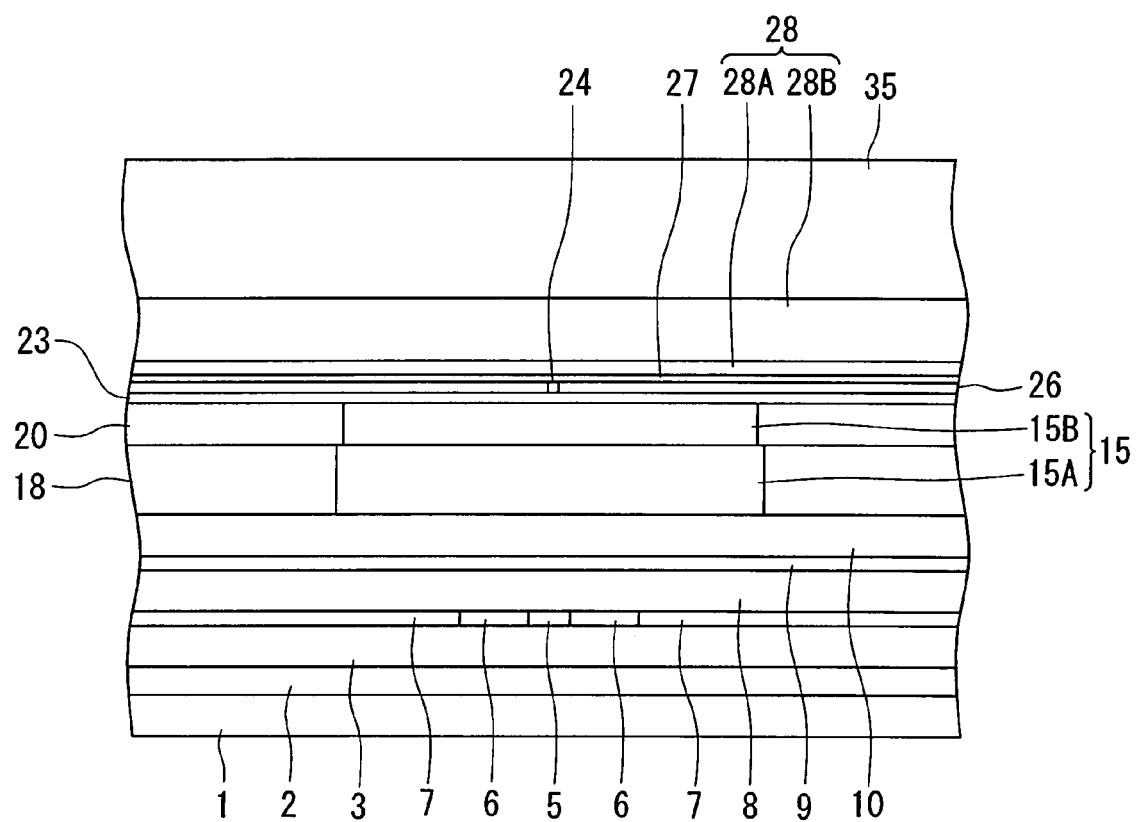
FIG. 2 is a front view of the medium facing surface of the magnetic head of the first embodiment of the invention.

Preferred embodiments of the invention will now be described in detail with reference to the accompanying drawings. Reference is now made to FIG. 1 and FIG. 2 to describe the configuration of a magnetic head for perpendicular magnetic recording (hereinafter simply called a magnetic head) of a first embodiment of the invention. Here is given an example of a magnetic head in which a TMR element utilizing a tunneling magnetoresistive effect is employed as the MR element. FIG. 1 is a cross-sectional view for illustrating the configuration of the magnetic head. FIG. 2 is a front view of the medium facing surface of the magnetic head. FIG. 1 illustrates a cross section orthogonal to the medium facing surface and the top surface of a substrate. The arrow indicated with T in FIG. 1 shows the direction of travel of a recording medium.

As shown in FIG. 1, the magnetic head of the embodiment has a medium facing surface 40 that faces toward a recording medium. As shown in FIG. 1 and FIG. 2, the magnetic head incorporates: a substrate 1 made of a ceramic such as aluminum oxide and titanium carbide ($Al_2O_3$—TiC); an insulating layer 2 made of an insulating material such as alumina ($Al_2O_3$) and disposed on the substrate 1; a first read shield layer 3 made of a magnetic material and disposed on the insulating layer 2; an MR element 5 disposed on the first read shield layer 3; two bias field applying layers 6 disposed adjacent to the two sides of the MR element 5 with respective insulating films not shown disposed in between; and an insulating layer 7 disposed around the MR element 5 and the bias field applying layers 6. The MR element 5 has an end located in the medium facing surface 40. The insulating layer 7 is made of an insulating material such as alumina. The magnetic head further incorporates: a second read shield layer 8 made of a magnetic material and disposed on the MR element 5, the bias field applying layers 6 and the insulating layer 7; and a separating layer 9 made of a nonmagnetic material such as alumina and disposed on the second read shield layer 8. The portion from the first read shield layer 3 to the second read shield layer 8 makes up a read head. Alternatively, in place of the second read shield layer 8, there may be provided a layered film made up of two magnetic layers and a nonmagnetic layer disposed between the two magnetic layers. The nonmagnetic layer is made of a nonmagnetic material such as ruthenium (Ru) or alumina.

The MR element 5 is a TMR element. A sense current for detecting magnetic signals is fed to the MR element 5 in a direction intersecting the plane of each layer making up the MR element 5, such as the direction perpendicular to the plane of each layer making up the MR element 5.

The magnetic head further incorporates: a magnetic layer 10 made of a magnetic material and disposed on the separating layer 9; and an insulating layer 11 made of an insulating material such as alumina and disposed around the magnetic layer 10. The magnetic layer 10 has an end face located in the medium facing surface 40. The magnetic layer 10 and the insulating layer 11 have flattened top surfaces.

The magnetic head further incorporates: an insulating film 12 disposed on the magnetic layer 10 and the insulating layer 11; a heater 13 disposed on the insulating film 12; and an insulating film 14 disposed on the insulating film 12 and the heater 13 such that the heater 13 is sandwiched between the insulating films 12 and 14. The function and material of the heater 13 will be described later. The insulating films 12 and 14 are made of an insulating material such as alumina. An end of each of the insulating films 12 and 14 closer to the medium facing surface 40 is located at a distance from the medium facing surface 40. In the example shown in FIG. 1, the end of the insulating film 14 closer to the medium facing surface 40 is located farther from the medium facing surface 40 than the end of the insulating film 12 closer to the medium facing surface 40. On the contrary, however, the end of the insulating film 12 closer to the medium facing surface 40 may be located farther from the medium facing surface 40 than the end of the insulating film 14 closer to the medium facing surface 40. Alternatively, the end of the insulating film 12 closer to the medium facing surface 40 and the end of the insulating film 14 closer to the medium facing surface 40 may be located such that the respective distances from the medium facing surface 40 are equal.

The magnetic head further incorporates a first shield 15 disposed on the magnetic layer 10. The first shield 15 includes: a first layer 15A disposed on the magnetic layer 10; and a second layer 15B disposed on the first layer 15A. The first layer 15A and the second layer 15B are made of a magnetic material. Each of the first layer 15A and the second layer 15B has an end face located in the medium facing surface 40. In the example shown in FIG. 1, the length of the second layer 15B taken in the direction orthogonal to the medium facing surface 40 is smaller than the length of the first layer 15A taken in the direction orthogonal to the medium facing surface 40. However, the length of the second layer 15B taken in the direction orthogonal to the medium facing surface 40 may be equal to or greater than the length of the first layer 15A taken in the direction orthogonal to the medium facing surface 40.

The magnetic head further incorporates: a coil 16 made of a conductive material and disposed on the insulating film 14; an insulating layer 17 with which the space between the coil 16 and the first layer 15A and the space between respective adjacent turns of the coil 16 are filled; and an insulating layer 18 disposed around the first layer 15A, the coil 16 and the insulating layer 17. The coil 16 is flat-whorl-shaped. The coil 16 includes a connecting portion 16a that is a portion near an inner end of the coil 16 and connected to another coil described later. The insulating layer 17 is made of photoresist, for example. The insulating layer 18 is made of alumina, for example. The first layer 15A, the coil 16, the insulating layer 17 and the insulating layer 18 have flattened top surfaces.

The magnetic head further incorporates: a connecting layer 19 made of a conductive material and disposed on the connecting portion 16a; and an insulating layer 20 made of an insulating material such as alumina and disposed around the second layer 15B and the connecting layer 19. The connecting layer 19 may be made of a material the same as that of the second layer 15B. The second layer 15B, the connecting layer 19 and the insulating layer 20 have flattened top surfaces.

The magnetic head further incorporates a first gap layer 23 disposed on the second layer 15B, the connecting layer 19 and the insulating layer 20. The first gap layer 23 has an opening formed in a region corresponding to the top surface of the connecting layer 19. The first gap layer 23 is made of a nonmagnetic insulating material such as alumina.

The magnetic head further incorporates: a pole layer 24 made of a magnetic material and disposed on the first gap layer 23; a connecting layer 25 made of a conductive material and disposed on the connecting layer 19; and an insulating layer 26 made of an insulating material such as alumina and disposed around the pole layer 24 and the connecting layer 25. The pole layer 24 has an end face located in the medium facing surface 40. The connecting layer 25 is connected to the connecting layer 19 through the opening of the first gap layer 23. The connecting layer 25 may be made of a material the same as that of the pole layer 24. The pole layer 24, the connecting layer 25 and the insulating layer 26 have flattened top surfaces.

The magnetic head further incorporates a second gap layer 27 disposed on the pole layer 24 and the insulating layer 26. The second gap layer 27 has an opening for exposing a portion of the top surface of the pole layer 24 away from the medium facing surface 40, and an opening for exposing the top surface of the connecting layer 25. The second gap layer 27 is made of a nonmagnetic material such as alumina.

The magnetic head further incorporates a second shield 28 disposed on the second gap layer 27. The second shield 28 has: a first layer 28A disposed on the second gap layer 27; and a second layer 28B disposed on the first layer 28A. The first layer 28A and the second layer 28B are made of a magnetic material. Each of the first layer 28A and the second layer 28B has an end face located in the medium facing surface 40.

The magnetic head further incorporates: a yoke layer 29 made of a magnetic material and disposed on a portion of the pole layer 24 away from the medium facing surface 40; a connecting layer 30 made of a conductive material and disposed on the connecting layer 25; and an insulating layer 31 made of an insulating material such as alumina and disposed around the first layer 28A, the yoke layer 29 and the connecting layer 30. The yoke layer 29 and the connecting layer 30 may be made of a material the same as that of the first layer 28A. The first layer 28A, the yoke layer 29, the connecting layer 30 and the insulating layer 31 have flattened top surfaces.

The magnetic head further incorporates an insulating layer 32 made of an insulating material such as alumina and disposed on the yoke layer 29 and the insulating layer 31. The insulating layer 32 has an opening for exposing the top surface of the first layer 28A, an opening for exposing a portion of the top surface of the yoke layer 29 near an end thereof farther from the medium facing surface 40, and an opening for exposing the top surface of the connecting layer 30.

The magnetic head further incorporates a coil 33 made of a conductive material and disposed on the insulating layer 32. The coil 33 is flat-whorl-shaped. The coil 33 includes a connecting portion 33a that is a portion near an inner end of the coil 33 and connected to the connecting portion 16a of the coil 16. The connecting portion 33a is connected to the connecting layer 30, and connected to the connecting portion 16a through the connecting layers 19, 25 and 30.

The magnetic head further incorporates an insulating layer 34 disposed to cover the coil 33. The insulating layer 34 is made of photoresist, for example. The second layer 28B of the second shield 28 is disposed on the first layer 28A, the yoke layer 29 and the insulating layer 34, and connects the first layer 28A and the yoke layer 29 to each other.

The magnetic head further incorporates an overcoat layer 35 made of an insulating material such as alumina and disposed to cover the second layer 28B. The portion from the magnetic layer 10 to the second layer 28B makes up a write head.

As described so far, the magnetic head includes the medium facing surface 40 that faces toward the recording medium, the read head and the write head. The read head and the write head are stacked on the substrate 1. The read head is disposed backward along the direction T of travel of the recording medium (that is, disposed closer to the air-inflow end of the slider), while the write head is disposed forward along the direction T of travel of the recording medium (that is, disposed closer to the air-outflow end of the slider). The magnetic head writes data on the recording medium through the use of the write head, and reads data stored on the recording medium through the use of the read head.

The read head incorporates the MR element 5, and the first read shield layer 3 and the second read shield layer 8 that are disposed to sandwich the MR element 5 therebetween. FIG. 1 and FIG. 2 illustrate an example in which the MR element 5 is a TMR element. The first read shield layer 3 and the second read shield layer 8 also function as a pair of electrodes for feeding a sense current to the MR element 5 in a direction intersecting the plane of each layer making up the MR element 5, such as the direction perpendicular to the plane of each layer making up the MR element 5. In addition to the first read shield layer 3 and the second read shield layer 8, a pair of electrodes may be respectively provided on top and bottom of the MR element 5. The MR element 5 has a resistance that changes in response to an external magnetic field, that is, a signal magnetic field sent from the recording medium. It is possible to determine the resistance of the MR element 5 from the sense current. In the manner thus described, it is possible to read data stored on the recording medium through the use of the read head.

The MR element 5 is not limited to the TMR element but may be a giant-magnetoresistive (GMR) element. The GMR element may be one having a current-in-plane (CIP) structure in which the sense current is fed in a direction nearly parallel to the plane of each layer making up the GMR element, or may be one having a current-perpendicular-to-plane (CPP) structure in which the sense current is fed in a direction intersecting the plane of each layer making up the GMR element, such as the direction perpendicular to the plane of each layer making up the GMR element. In the case in which the MR element 5 is a GMR element having the CIP structure, a pair of electrodes for feeding the sense current to the MR element 5 are provided on both sides of the MR element 5 taken in the width direction, and shield gap films made of an insulating material are respectively provided between the MR element 5 and the first read shield layer 3 and between the MR element 5 and the second read shield layer 8.

The write head incorporates the magnetic layer 10, the first shield 15, the coil 16, the first gap layer 23, the pole layer 24, the second gap layer 27, the second shield 28, the yoke layer 29, and the coil 33. The first shield 15 is located closer to the substrate 1 than the second shield 28.

The coils 16 and 33 generate a magnetic field that corresponds to data to be written on the recording medium. The pole layer 24 has an end face located in the medium facing surface 40, and allows a magnetic flux corresponding to the magnetic field generated by the coils 16 and 33 to pass and generates a write magnetic field used for writing the data on the recording medium by means of the perpendicular magnetic recording system.

The first shield 15 is made of a magnetic material, and has an end face located in the medium facing surface 40 at a position backward of the end face of the pole layer 24 along the direction T of travel of the recording medium. The first gap layer 23 is made of a nonmagnetic material, has an end face located in the medium facing surface 40, and is disposed between the first shield 15 and the pole layer 24. In the embodiment, the first shield 15 includes the first layer 15A disposed on the magnetic layer 10, and the second layer 15B disposed on the first layer 15A. Part of the coil 16 is located on a side of the first layer 15A so as to pass through the space between the magnetic layer 10 and the pole layer 24.

The first layer 15A has a thickness within a range of 0.5 to 3 μm inclusive, for example. The first layer 15A has a width of 5 μm or greater, for example. The length of the first layer 15A taken in the direction orthogonal to the medium facing surface 40 is within a range of 0.5 to 2.0 μm inclusive, for example. The second layer 15B has a thickness within a range of 0.1 to 1.5 μm inclusive, for example. The second layer 15B has a width of 5 μm or greater, for example. The length of the second layer 15B taken in the direction orthogonal to the medium facing surface 40 is within a range of 0.1 to 1.0 μm inclusive, for example. However, the length of the second layer 15B taken in the direction orthogonal to the medium facing surface 40 is preferably smaller than the length of the first layer 15A taken in the direction orthogonal to the medium facing surface 40. The 'thickness' of each of the layers that make up the magnetic head, such as the first layer 15A and the second layer 15B, is the dimension taken in the direction in which the plurality of layers making up the magnetic head are stacked.

The magnetic layer 10 has a function of returning a magnetic flux that has been generated from the end face of the pole layer 24 and has magnetized the recording medium. FIG. 1 illustrates an example in which the end face of the magnetic layer 10 is located in the medium facing surface 40. However, since the magnetic layer 10 is connected to the first shield 15 having the end face located in the medium facing surface 40, the end face of the magnetic layer 10 closer to the medium facing surface 40 may be located at a distance from the medium facing surface 40.

In the medium facing surface 40 the end face of the first shield 15 (the end face of the second layer 15B) is located backward of the end face of the pole layer 24 along the direction T of travel of the recording medium (that is, located closer to the air-inflow end of the slider) with a specific small distance provided therebetween by the first gap layer 23. The distance between the end face of the pole layer 24 and the end face of the first shield 15 in the medium facing surface 40 is preferably within a range of 0.05 to 0.7 μm inclusive. This range has been determined from simulation results that will be described later.

The first shield 15 takes in a magnetic flux that is generated from the end face of the pole layer 24 located in the medium facing surface 40 and that expands in directions except the direction orthogonal to the surface of the recording medium, and thereby prevents this flux from reaching the recording medium. It is thereby possible to improve recording density.

The second shield 28 is made of a magnetic material, and has an end face located in the medium facing surface 40 at a position forward of the end face of the pole layer 24 along the direction T of travel of the recording medium. The second gap layer 27 is made of a nonmagnetic material, has an end face located in the medium facing surface 40, and is disposed between the second shield 28 and the pole layer 24. In the embodiment, the second shield 28 has: the first layer 28A disposed on the second gap layer 27; and the second layer 28B disposed on the first layer 28A. Part of the coil 33 is disposed to pass through the space surrounded by the pole layer 24 and the second shield 28. The second shield 28 is connected to the yoke layer 29 at a position away from the medium facing surface 40. Therefore, the second shield 28 is connected to the pole layer 24 through the yoke layer 29 at a position away from the medium facing surface 40. The pole layer 24, the second shield 28 and the yoke layer 29 form a magnetic path through which the magnetic flux corresponding to the magnetic field generated by the coil 33 passes.

In the medium facing surface 40 the end face of the second shield 28 (the end face of the first layer 28A) is located forward of the end face of the pole layer 24 along the direction T of travel of the recording medium (that is, located closer to the air-outflow end of the slider) with a specific small distance provided therebetween by the second gap layer 27. The distance between the end face of the pole layer 24 and the end face of the second shield 28 in the medium facing surface 40 is preferably equal to or smaller than 0.2 μm, and more preferably within a range of 25 to 50 nm inclusive, so that the second shield 28 can fully exhibit its function as a shield.

The position of the end of a bit pattern to be written on the recording medium is determined by the position of an end of the pole layer 24 closer to the second gap layer 27 in the medium facing surface 40. The second shield 28 takes in a magnetic flux that is generated from the end face of the pole layer 24 located in the medium facing surface 40 and that expands in directions except the direction orthogonal to the surface of the recording medium, and thereby prevents this flux from reaching the recording medium. It is thereby possible to improve recording density. Furthermore, the second shield 28 takes in a disturbance magnetic field applied from outside the magnetic head to the magnetic head. It is thereby possible to prevent erroneous writing on the recording medium caused by the disturbance magnetic field intensively taken in into the pole layer 24. The second shield 28 also has a function of returning a magnetic flux that has been generated from the end face of the pole layer 24 and has magnetized the recording medium.

FIG. 1 illustrates an example in which the magnetic layer 10 and the first shield 15 are not connected to the pole layer 24. However, the magnetic layer 10 and the pole layer 24 may be connected to each other at a position away from the medium facing surface 40. The coil 16 is not a component requisite for the write head and may be omitted. FIG. 1 illustrates an example in which the yoke layer 29 is disposed on the pole layer 24, that is, disposed forward of the pole layer 24 along the direction T of travel of the recording medium (that is, disposed closer to the air-outflow end of the slider). However, the yoke layer 29 may be disposed below the pole layer 24, that is, disposed backward of the pole layer 24 along the direction T of travel of the recording medium (that is, disposed closer to the air-inflow end of the slider).

Figure 3:
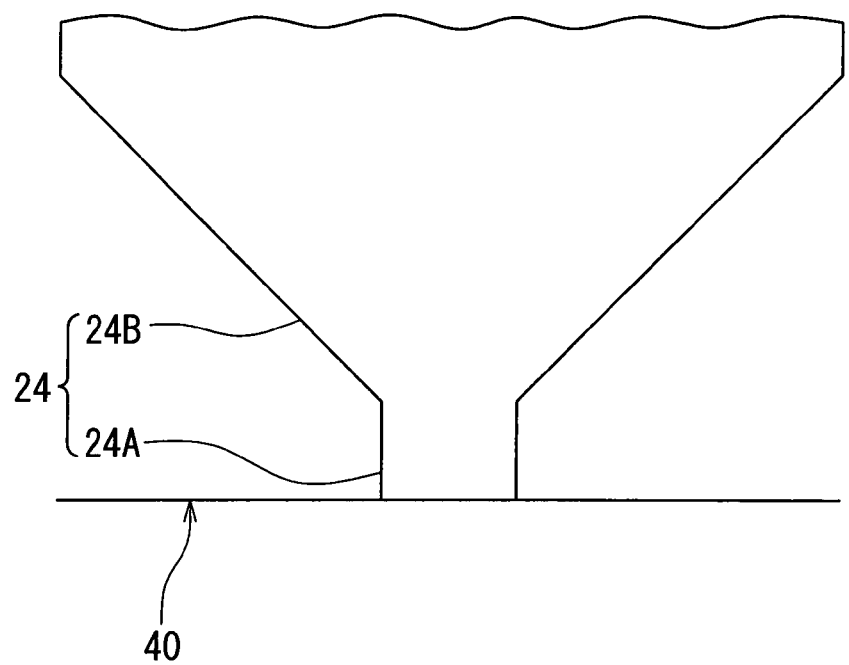
FIG. 3 is a top view of part of a pole layer of the first embodiment of the invention.

Reference is now made to FIG. 3 to describe the shape of the pole layer 24. FIG. 3 is a top view of a portion of the pole layer 24 near the medium facing surface 40. The pole layer 24 incorporates a track width defining portion 24A and a wide portion 24B. The track width defining portion 24A includes a first end located in the medium facing surface 40 and a second end located away from the medium facing surface 40, and has a width that defines track width. The wide portion 24B is coupled to the second end of the track width defining portion 24A and has a width greater than the width of the track width defining portion 24A. The width of the track width defining portion 24A is nearly uniform. The wide portion 24B is, for example, equal in width to the track width defining portion 24A at the boundary with the track width defining portion 24A, and gradually increases in width as the distance from the medium facing surface 40 increases and then maintains a specific width to the end of the wide portion 24B.

The heater 13 is provided for heating the components of the write head including the pole layer 24 so as to control the distance between the recording medium and the end face of the pole layer 24 located in the medium facing surface 40. Two leads (not shown) are connected to the heater 13. The heater 13 is made of an NiCr film or a layered film made up of a Ta film, an NiCu film and a Ta film, for example. The heater 13 is energized through the two leads and thereby produces heat, and heats the components of the write head. As a result, the components of the write head expand and the end face of the pole layer 24 located in the medium facing surface 40 gets closer to the recording medium.

Reference is now made to FIG. 4 to FIG. 20 to describe a method of manufacturing the magnetic head of the embodiment. Each of FIG. 4 to FIG. 20 is a cross-sectional view of a layered structure obtained in the course of manufacturing process of the magnetic head. In FIG. 4 to FIG. 20 the portions from the substrate 1 to the separating layer 9 are omitted. In FIG. 4 to FIG. 20 the broken line with ABS indicates the position at which the medium facing surface 40 is to be formed.

In the method of manufacturing the magnetic head of the embodiment, for example, components of a plurality of magnetic heads are formed on a single substrate (wafer) to thereby fabricate a substructure in which pre-slider portions each of which will be a slider later are aligned in a plurality of rows. Next, the substructure is cut to fabricate a slider aggregate including a single row of the pre-slider portions. Next, a surface formed in the slider aggregate by cutting the substructure is lapped to form the medium facing surfaces 40 of the pre-slider portions that the slider aggregate includes. Next, flying rails are formed in the medium facing surfaces 40. Next, the slider aggregate is cut so that the pre-slider portions are separated from one another, and a plurality of sliders respectively including the magnetic heads are thereby formed.

Attention being drawn to one of the magnetic heads, the method of manufacturing the magnetic head of the embodiment will now be described. In this method, first, the insulating layer 2 is formed on the substrate 1. Next, the first read shield layer 3 is formed on the insulating layer 2. Next, the MR element 5, the two bias field applying layers 6 and the insulating layer 7 are formed on the first read shield layer 3. Next, the second read shield layer 8 is formed on the MR element 5, the bias field applying layers 6 and the insulating layer 7. Next, the separating layer 9 is formed on the second read shield layer 8.

Figure 4:
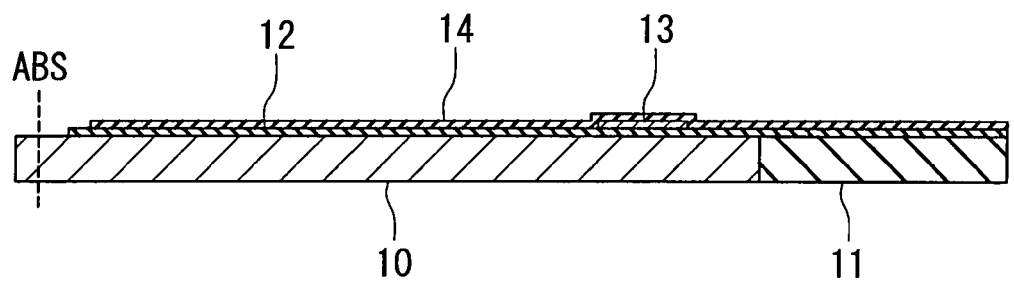
FIG. 4 is a cross-sectional view for illustrating a step of a method of manufacturing the magnetic head of the first embodiment of the invention.

FIG. 4 illustrates the following step. In the step, first, the magnetic layer 10 is formed on the separating layer 9 by frame plating, for example. Next, the insulating layer 11 is formed to cover the magnetic layer 10. Next, the insulating layer 11 is polished by chemical mechanical polishing (CMP) so that the magnetic layer 10 is exposed, and the top surfaces of the magnetic layer 10 and the insulating layer 11 are thereby flattened. Next, the insulating film 12 is formed on the magnetic layer 10 and the insulating layer 11. Next, the heater 13 and the leads not shown are formed on the insulating film 12. Next, the insulating film 14 is formed on the insulating film 12, the heater 13 and the leads so as to cover the heater 13 and the leads.

Figure 5:
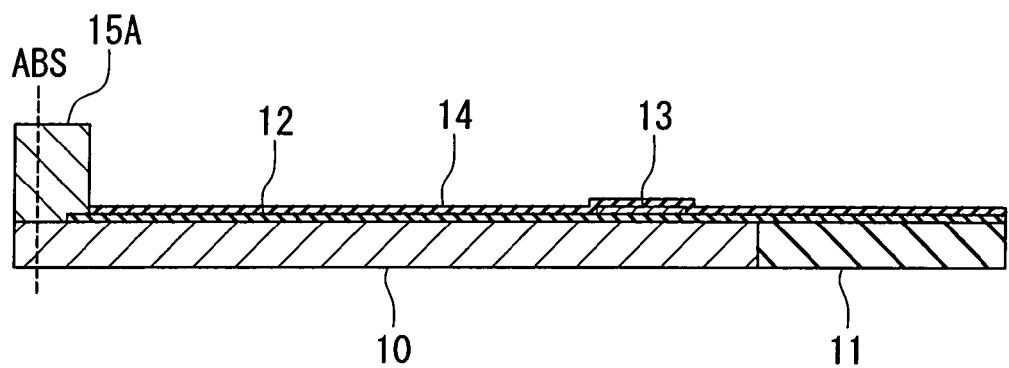
FIG. 5 is a cross-sectional view for illustrating a step that follows the step of FIG. 4.
Figure 6:
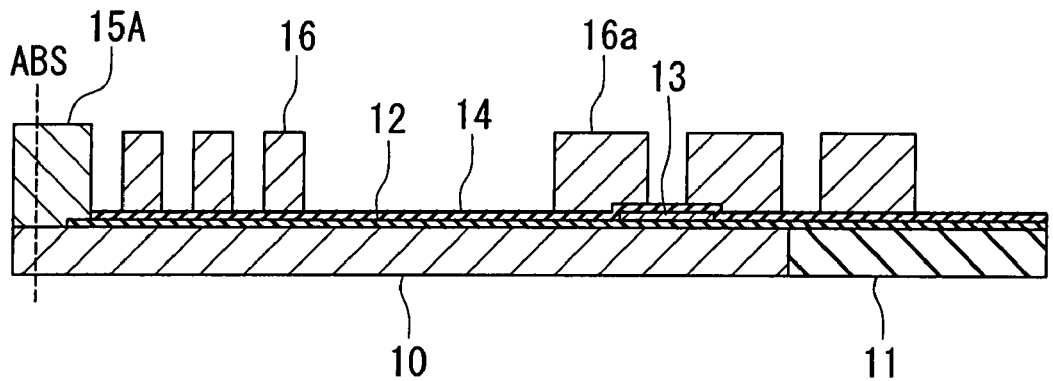
FIG. 6 is a cross-sectional view for illustrating a step that follows the step of FIG. 5.
Figure 7:
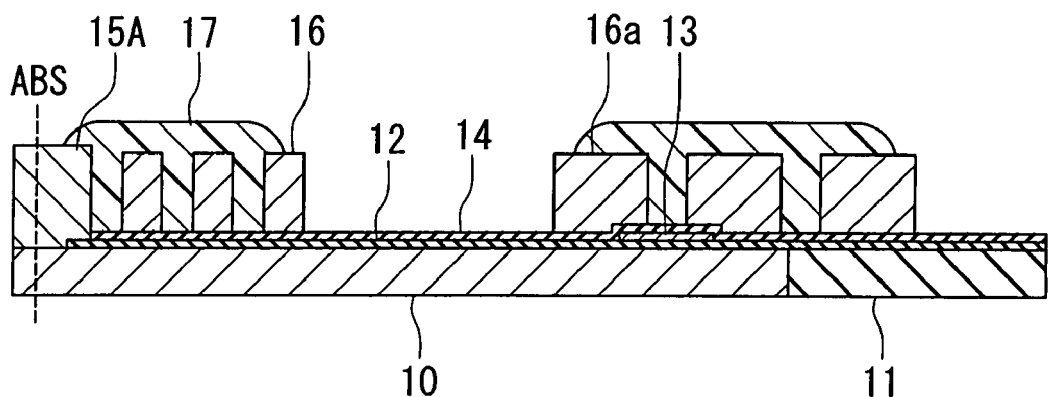
FIG. 7 is a cross-sectional view for illustrating a step that follows the step of FIG. 6.

Next, as shown in FIG. 5, the first layer 15A of the first shield 15 is formed on the magnetic layer 10 by frame plating, for example. Next, as shown in FIG. 6, the coil 16 is formed on the insulating film 14 by frame plating, for example. Next, as shown in FIG. 7, the insulating layer 17 is formed so that the space between the coil 16 and the first layer 15A and the space between the respective adjacent turns of the coil 16 are filled with the insulating layer 17.

Figure 8:
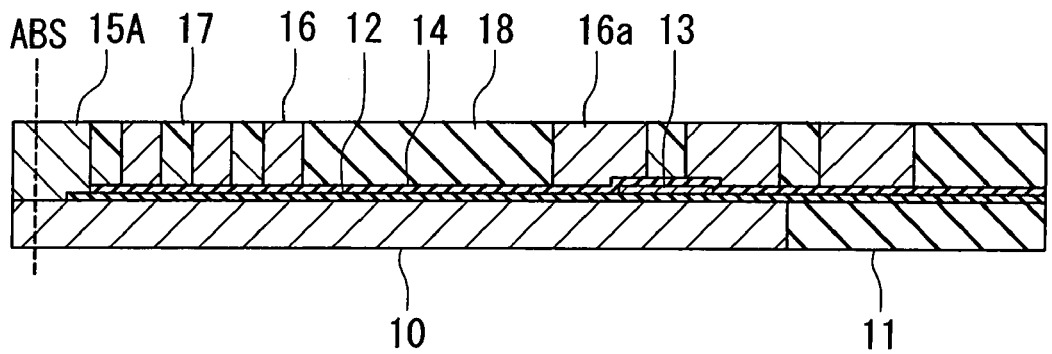
FIG. 8 is a cross-sectional view for illustrating a step that follows the step of FIG. 7.

FIG. 8 illustrates the following step. In the step, first, the insulating layer 18 is formed on the entire top surface of the layered structure of FIG. 7. Next, the insulating layer 18 is polished by CMP, for example, so that the first layer 15A and the coil 16 are exposed, and the top surfaces of the first layer 15A, the coil 16 and the insulating layer 18 are thereby flattened.

Figure 9:
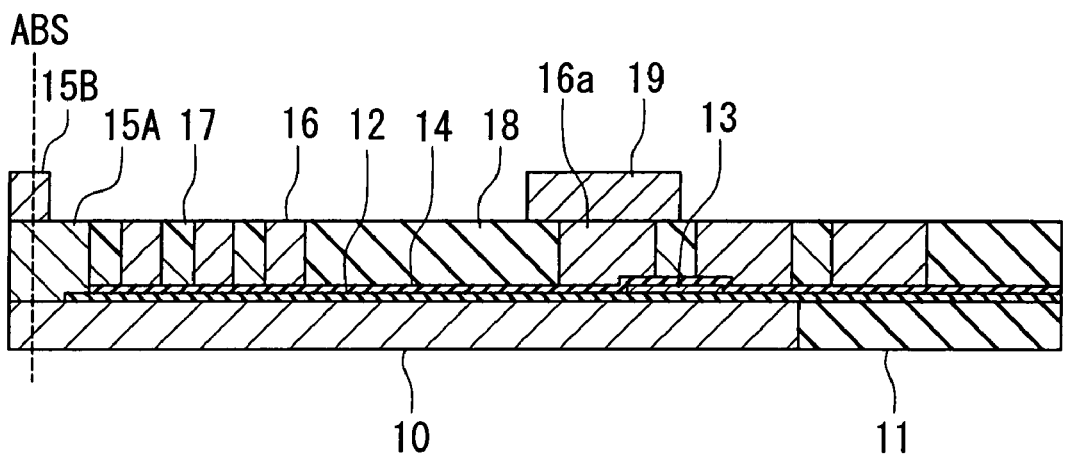
FIG. 9 is a cross-sectional view for illustrating a step that follows the step of FIG. 8.

Next, as shown in FIG. 9, the second layer 15B and the connecting layer 19 are formed by frame plating, for example.

Figure 10:
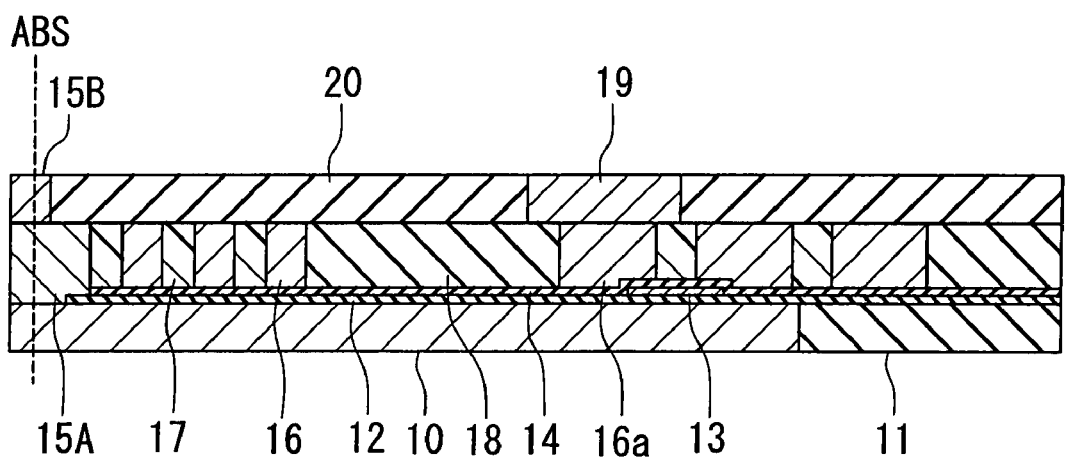
FIG. 10 is a cross-sectional view for illustrating a step that follows the step of FIG. 9.

FIG. 10 illustrates the following step. In the step, first, the insulating layer 20 is formed on the entire top surface of the layered structure of FIG. 9. Next, the insulating layer 20 is polished by CMP, for example, so that the second layer 15B and the connecting layer 19 are exposed, and the top surfaces of the second layer 15B, the connecting layer 19 and the insulating layer 20 are thereby flattened.

Figure 11:
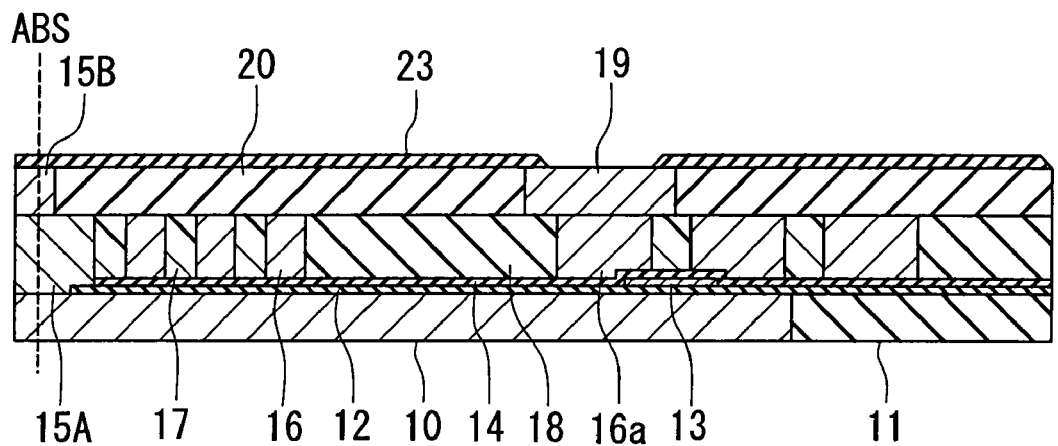
FIG. 11 is a cross-sectional view for illustrating a step that follows the step of FIG. 10.

FIG. 11 illustrates the following step. In the step, first, the first gap layer 23 is formed on the entire top surface of the layered structure of FIG. 10. Next, an opening is formed by ion milling, for example, in a region of the first gap layer 23 corresponding to the top surface of the connecting layer 19.

Figure 12:
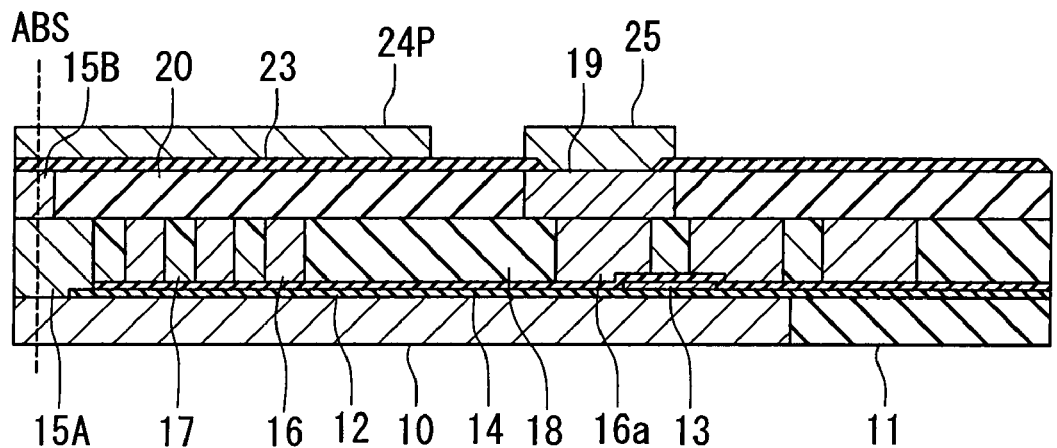
FIG. 12 is a cross-sectional view for illustrating a step that follows the step of FIG. 11.

Next, as shown in FIG. 12, a plating layer 24P that will be the pole layer 24 later and the connecting layer 25 are formed by frame plating.

Figure 13:
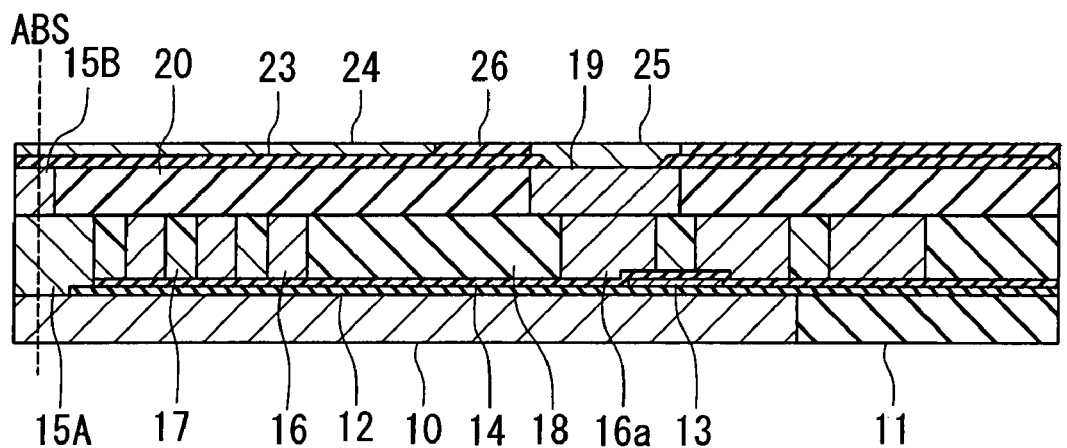
FIG. 13 is a cross-sectional view for illustrating a step that follows the step of FIG. 12.

FIG. 13 illustrates the following step. In the step, first, the insulating layer 26 is formed on the entire top surface of the layered structure of FIG. 12. Next, the insulating layer 26, the plating layer 24P and the connecting layer 25 are polished by CMP, for example, so that the plating layer 24P and the connecting layer 25 are exposed and these layers have desired thicknesses, and the top surfaces of these layers are thereby flattened. The plating layer 24P becomes the pole layer 24 by being polished to have a desired thickness.

Figure 14:
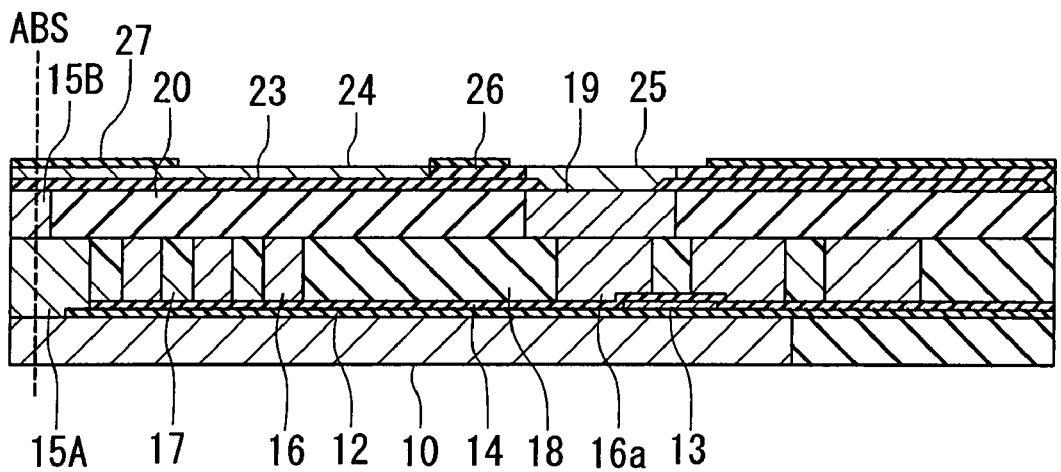
FIG. 14 is a cross-sectional view for illustrating a step that follows the step of FIG. 13.

FIG. 14 illustrates the following step. In the step, first, the second gap layer 27 is formed on the entire top surface of the layered structure of FIG. 13. Next, an opening for exposing a portion of the top surface of the pole layer 24 and an opening for exposing the top surface of the connecting layer 25 are formed by ion milling, for example, in the second gap layer 27.

Figure 15:
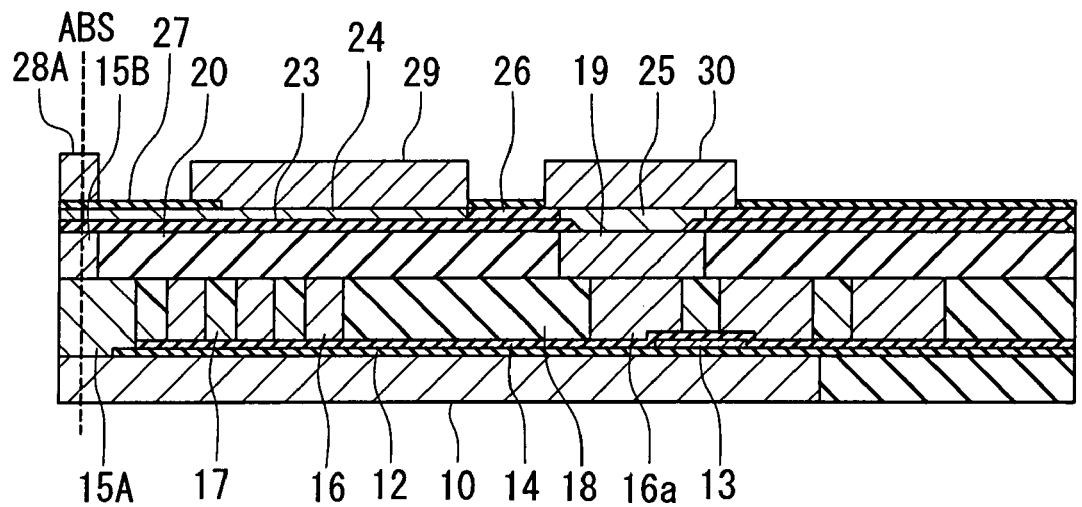
FIG. 15 is a cross-sectional view for illustrating a step that follows the step of FIG. 14.

Next, as shown in FIG. 15, the first layer 28A of the second shield 28, the yoke layer 29 and the connecting layer 30 are formed by frame plating, for example.

Figure 16:
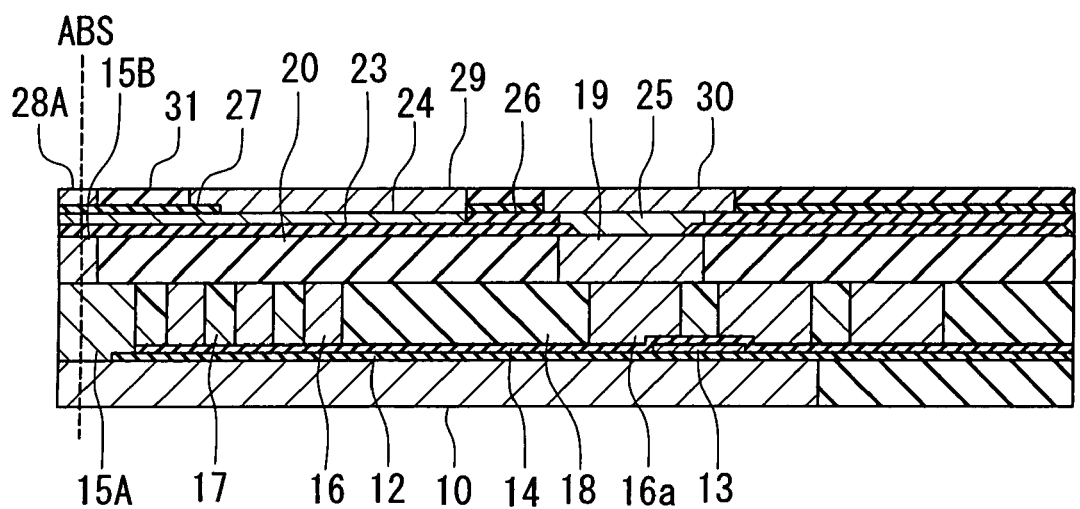
FIG. 16 is a cross-sectional view for illustrating a step that follows the step of FIG. 15.

FIG. 16 illustrates the following step. In the step, first, the insulating layer 31 is formed on the entire top surface of the layered structure of FIG. 15. Next, the insulating layer 31, the first layer 28A, the yoke layer 29 and the connecting layer 30 are polished by CMP, for example, so that the first layer 28A, the yoke layer 29 and the connecting layer 30 are exposed and these layers have desired thicknesses, and the top surfaces of these layers are thereby flattened.

Figure 17:
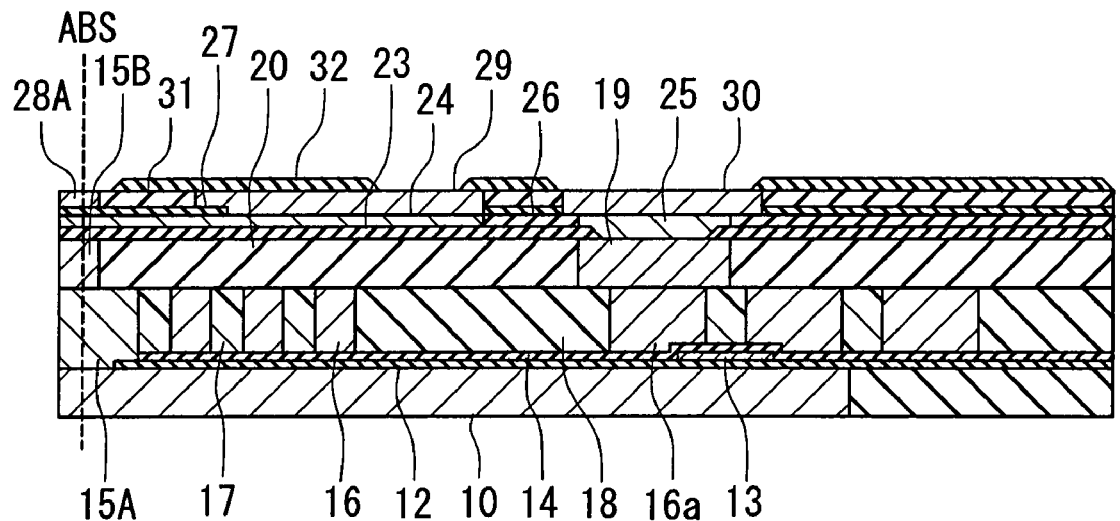
FIG. 17 is a cross-sectional view for illustrating a step that follows the step of FIG. 16.

Next, as shown in FIG. 17, the insulating layer 32 is formed on the yoke layer 29 and the insulating layer 31. The insulating layer 32 may be formed by etching a portion of an insulating film formed on the entire top surface of the layered structure of FIG. 16 by ion milling, for example, or may be formed by lift-off.

Figure 18:
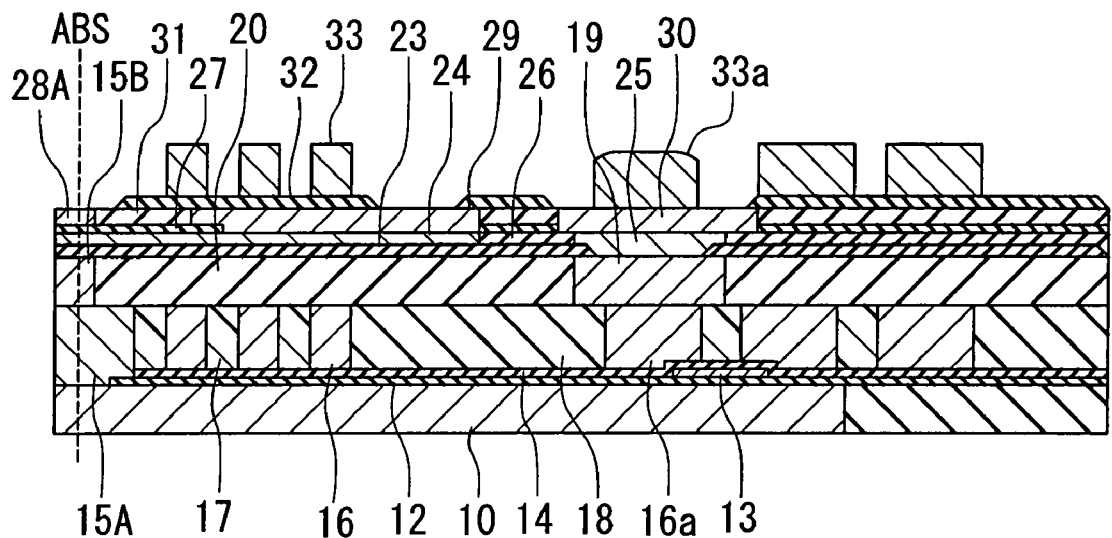
FIG. 18 is a cross-sectional view for illustrating a step that follows the step of FIG. 17.
Figure 19:
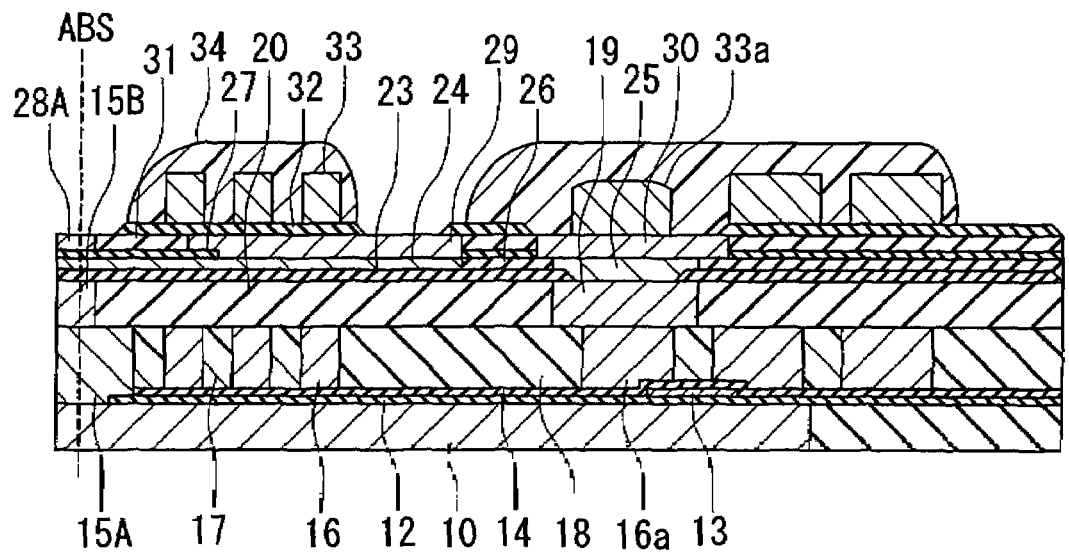
FIG. 19 is a cross-sectional view for illustrating a step that follows the step of FIG. 18.
Figure 20:
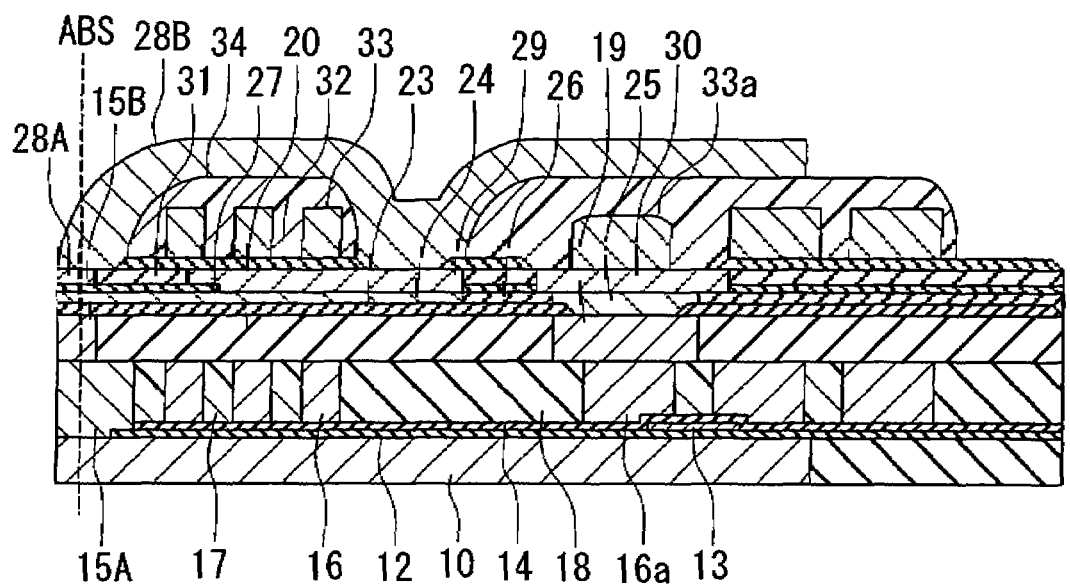
FIG. 20 is a cross-sectional view for illustrating a step that follows the step of FIG. 19.

Next, as shown in FIG. 18, the coil 33 is formed. The connecting portion 33a of the coil 33 is disposed on the connecting layer 30, and the other portion of the coil 33 is disposed on the insulating layer 32. Next, as shown in FIG. 19, the insulating layer 34 is formed to cover the coil 33. Next, as shown in FIG. 20, the second layer 28B is formed by frame plating, for example.

Next, as shown in FIG. 1, the overcoat layer 35 is formed. Next, wiring and terminals and so on are formed on the overcoat layer 35. In the embodiment, two terminals connected to the MR element 5, two terminals connected to the coils 16 and 33, and two terminals connected to the heater 13 are formed on the overcoat layer 35. The substructure is thus fabricated.

Next, as previously described, the substructure is cut, the surface to be the medium facing surface 40 is lapped to form the medium facing surface 40, flying rails are formed in the medium facing surface 40, and the slider including the magnetic head is thus completed.

In the embodiment, the first shield 15 includes the first layer 15A, and the second layer 15B that is disposed between the first layer 15A and the first gap layer 23 so as to touch the first layer 15A and the first gap layer 23. The thickness of each of the first layer 15A and the second layer 15B is smaller than the thickness of the entire first shield 15 without exception. Therefore, it is possible to form each of the first layer 15A and the second layer 15B with higher precision, compared with the precision of the shape of the first shield 15 in the case in which the entire first shield 15 is formed of a single layer. For example, in a case in which the first layer 15A and the second layer 15B are each formed by frame plating, it is possible that the thickness of the frame required for forming the first layer 15A and the thickness of the frame required for forming the second layer 15B are smaller than the thickness of the frame required for forming the first shield 15 in the case in which the entire first shield 15 is formed of a single layer. It is thereby possible to form each of the first layer 15A and the second layer 15B with precision.

Therefore, according to the embodiment, it is possible to form the first shield 15 with higher precision, compared with the case in which the entire first shield 15 is formed of a single layer, and as a result, it is possible to control the shape of the first shield 15 with precision. The shape of the second layer 15B of the first shield 15 particularly exerts a great influence on write characteristics. According to the embodiment, since it is possible to control the shape of the second layer 15B with precision, it is possible to control the write characteristics with precision.

According to the embodiment, if the length of the second layer 15B taken in the direction orthogonal to the medium facing surface 40 is smaller than the length of the first layer 15A taken in the direction orthogonal to the medium facing surface 40, it is possible to control the shape of the second layer 15B with higher precision.

Here is given a description of results of a simulation performed to study effects on the write characteristics that can be exerted by the length of the second layer 15B taken in the direction orthogonal to the medium facing surface 40 and the distance between the end face of the pole layer 24 and the end face of the first shield 15 (the end face of the second layer 15B) taken in the medium facing surface 40. Here, the length of the second layer 15B taken in the direction orthogonal to the medium facing surface 40 is indicated with LSH, and the distance between the end face of the pole layer 24 and the end face of the first shield 15 (the end face of the second layer 15B) taken in the medium facing surface 40 is indicated with LSG.

Dimensions of a model of the magnetic head used in the simulation are as follows. The thickness of the first layer 15A is 2.1 µm. The width of the first layer 15A is 38 µm. The length of the first layer 15A taken in the direction orthogonal to the medium facing surface 40 is 1.0 µm. The thickness of the second layer 15B is 0.7 µm. The width of the second layer 15B is 23 µm. The distance between the end face of the pole layer 24 and the end face of the second shield 28 taken in the medium facing surface 40 is 0.04 µm. The distance between the medium facing surface 40 and a recording layer of a recording medium is 0.02 µm. The coercivity of the recording layer is 5000 Oe (1 Oe is 79.6 A/m).

In the simulation, first, the relationship between the length LSH of the second layer 15B taken in the direction orthogonal to the medium facing surface 40 and a skew dependence as one of the write characteristics was studied. Here, the skew means an angle of tilt of the magnetic head with respect to the tangent of a circular track of a magnetic disk platter. The skew changes in accordance with the position of the magnetic head along the direction across the track. If the skew increases, the width of a write track increases. If a variation in write track width occurring in response to a change in skew is great, it is difficult to enhance recording density. One of the functions of the first shield 15 is to suppress the variation in write track width occurring in response to a change in skew. The skew dependence is a parameter that indicates the magnitude of a variation in write track width occurring in response to a change in skew. Here, the skew dependence is defined as follows. The magnitude of a variation in write track width occurring in response to a change in skew from zero to 15 degrees in a magnetic head to be evaluated is divided by the magnitude of a variation in write track width occurring in response to a change in skew from zero to 15 degrees in a magnetic head in which the first shield 15 is not provided. The result thus obtained which is expressed in percent is defined as the skew dependence. It can be said that the smaller the skew dependence, the better is the write characteristic.

Figure 21:
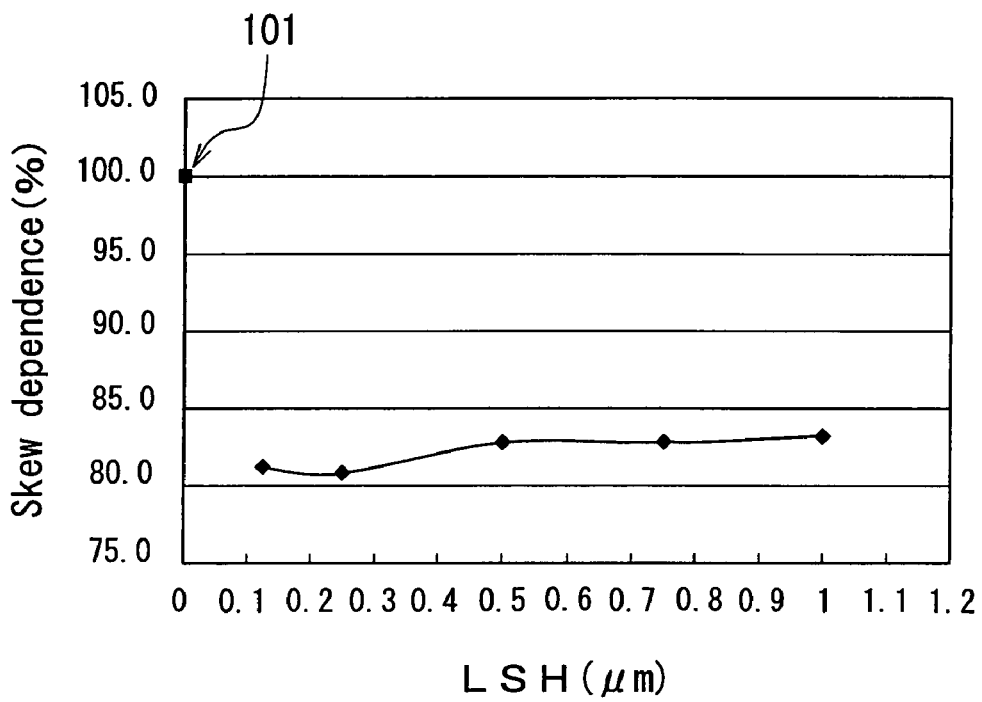
FIG. 21 is a plot showing simulation results.

FIG. 21 shows the relationship between the length LSH and the skew dependence obtained through the simulation. In FIG. 21 the point with numeral 101 indicates the skew dependence of a model of the magnetic head in which the first shield 15 is not provided. The other points in FIG. 21 indicate the skew dependence of a model of the magnetic head provided with the first shield 15 and having the above-mentioned dimensions. The simulation results shown in FIG. 21 indicate that while the changes in skew dependence in response to changes in the length LSH are small, the effect of reducing the skew dependence is slightly greater if the length LSH is smaller.

In the simulation, the relationship between the length LSH and the write magnetic field intensity as one of the write characteristics was also studied. Here, the write magnetic field intensity is defined as follows. The magnitude of write magnetic field of the magnetic head to be evaluated is divided by the magnitude of write magnetic field of the magnetic head in which the first shield 15 is not provided. The result thus obtained which is expressed in percent is defined as the write magnetic field intensity. It can be said that the greater the write magnetic field intensity, the better is the write characteristic.

Figure 22:
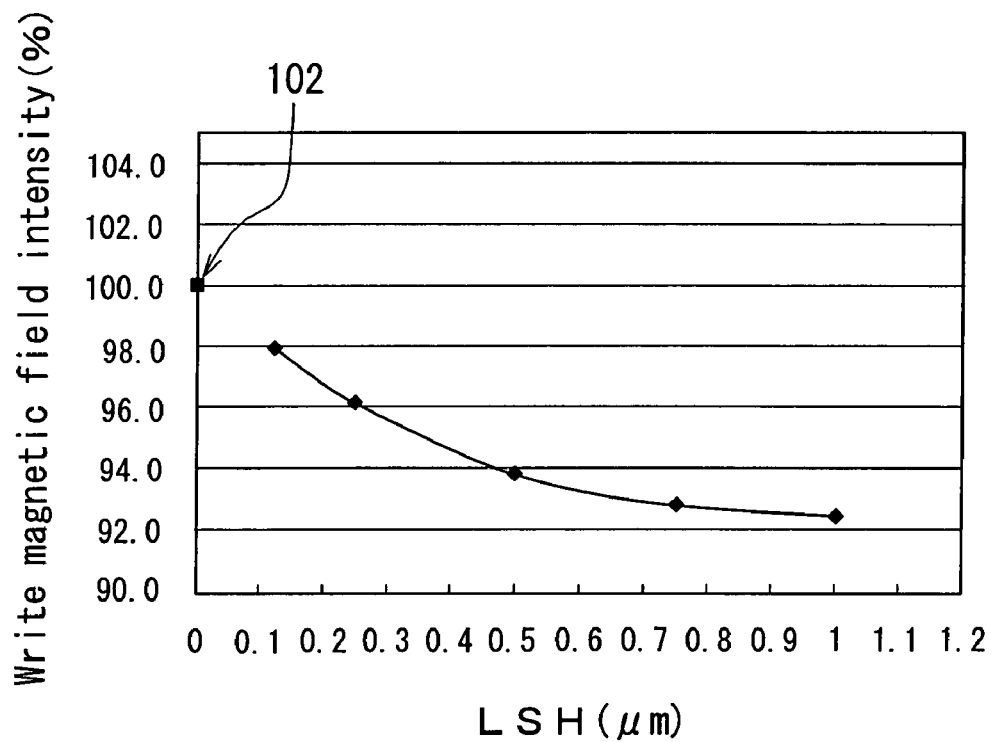
FIG. 22 is another plot showing simulation results.

FIG. 22 shows the relationship between the length LSH and the write magnetic field intensity obtained through the simulation. In FIG. 22 the point with numeral 102 indicates the write magnetic field intensity of the model of the magnetic head in which the first shield 15 is not provided. The other points in FIG. 22 indicate the write magnetic field intensity of the model of the magnetic head provided with the first shield 15 and having the above-mentioned dimensions. The simulation results shown in FIG. 22 indicate that the write magnetic field intensity decreases as the length LSH increases.

The simulation results shown in FIG. 21 and FIG. 22 indicate that the length LSH has influences on the write characteristics. Therefore, in order to allow the function of the first shield 15 to be effectively exerted and to control the write characteristics with precision, it is required to control the length LSH with precision. As previously described, according to the embodiment, the first shield 15 includes the first layer 15A and the second layer 15B, so that it is possible to control the shape of the first shield 15 including the length LSH with precision. The embodiment therefore allows the function of the first shield 15 to be effectively exerted and makes it possible to control the write characteristics with precision.

Figure 23:
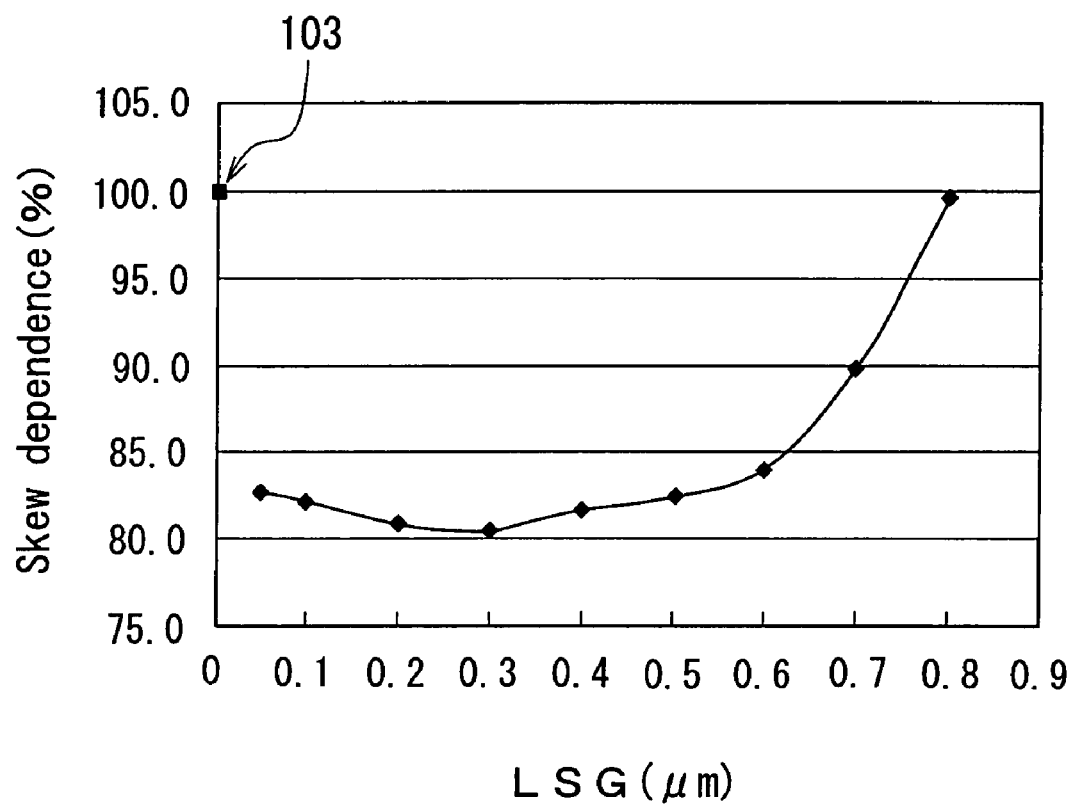
FIG. 23 is still another plot showing simulation results.

In the simulation, the relationship between the skew dependence and the distance LSG between the end face of the pole layer 24 and the end face of the first shield 15 (the end face of the second layer 15B) taken in the medium facing surface 40 was also studied. FIG. 23 shows the relationship between the distance LSG and the skew dependence obtained through the simulation. In FIG. 23 the point with numeral 103 indicates the skew dependence of the model of the magnetic head in which the first shield 15 is not provided. The other points in FIG. 23 indicate the skew dependence of the model of the magnetic head provided with the first shield 15 and having the above-mentioned dimensions. The simulation results shown in FIG. 23 indicate that, as long as the distance LSG is within a range of 0.05 to 0.7 μm inclusive, it is possible to make the skew dependence lower with certainty, compared with the case in which the first shield 15 is not provided. From the above simulation results, it can be said that the distance LSG should preferably be within the range of 0.05 to 0.7 μm inclusive.

The models used in the foregoing simulation were ones in which the magnetic layer 10 and the pole layer 24 were not connected to each other. However, even using models in which the magnetic layer 10 and the pole layer 24 are connected to each other at a position away from the medium facing surface 40, it is possible to obtain results similar to those obtained with the models in which the magnetic layer 10 and the pole layer 24 are not connected to each other.

Figure 24:
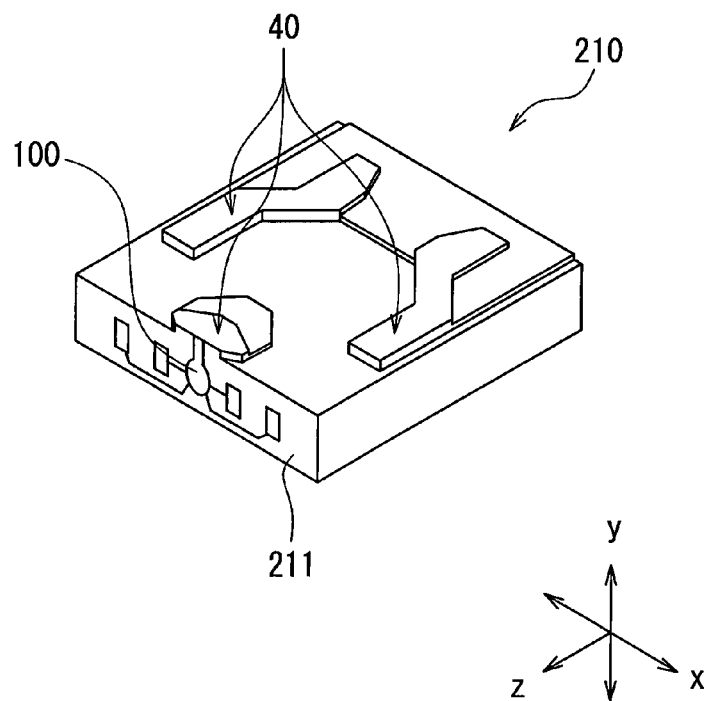
FIG. 24 is a perspective view for illustrating an example of appearance of a slider including the magnetic head of the first embodiment of the invention.

A head assembly and a magnetic disk drive of the embodiment will now be described. Reference is made to FIG. 24 to describe a slider 210 incorporated in the head assembly. In the magnetic disk drive the slider 210 is placed to face toward a magnetic disk platter that is a circular-plate-shaped recording medium to be driven to rotate. The slider 210 has a base body 211 made up mainly of the substrate 1 and the overcoat layer 35 of FIG. 1. The base body 211 is nearly hexahedron-shaped. One of the six surfaces of the base body 211 faces toward the magnetic disk platter. The medium facing surface 40 is formed in this one of the surfaces. When the magnetic disk platter rotates in the z direction of FIG. 24, an airflow passes between the magnetic disk platter and the slider 210, and a lift is thereby generated below the slider 210 in the y direction of FIG. 24 and exerted on the slider 210. The slider 210 flies over the surface of the magnetic disk platter by means of the lift. The x direction of FIG. 24 is across the tracks of the magnetic disk platter. The thin-film magnetic head 100 of the embodiment is formed near the air-outflow-side end (the end located at the lower left of FIG. 24) of the slider 210.

Figure 25:
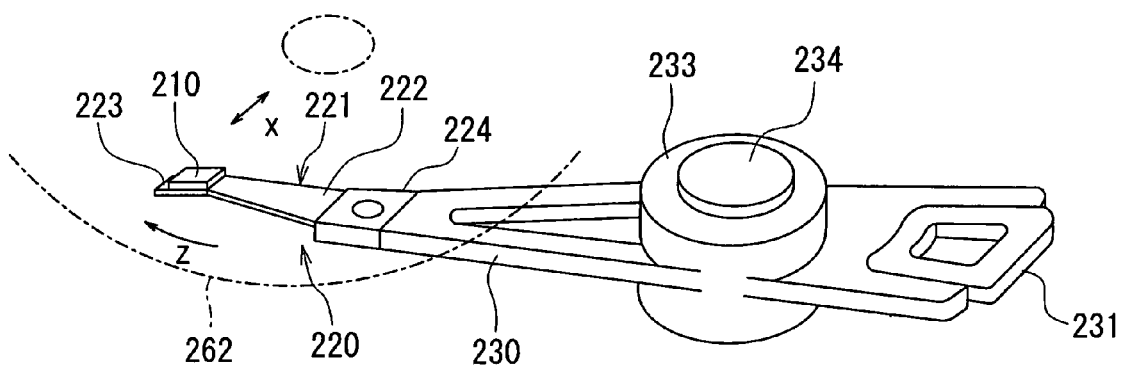
FIG. 25 is a perspective view of a head arm assembly of the first embodiment of the invention.

Reference is now made to FIG. 25 to describe the head assembly of the embodiment. The head assembly of the embodiment incorporates the slider 210 and a supporter that flexibly supports the slider 210. Modes of this head assembly include a head gimbal assembly and a head arm assembly described below.

The head gimbal assembly 220 will be first described. The head gimbal assembly 220 incorporates the slider 210 and a suspension 221 as the supporter that flexibly supports the slider 210. The suspension 221 incorporates: a plate-spring-shaped load beam 222 made of stainless steel, for example; a flexure 223 to which the slider 210 is joined, the flexure 223 being located at an end of the load beam 222 and giving an appropriate degree of freedom to the slider 210; and a base plate 224 located at the other end of the load beam 222. The base plate 224 is attached to an arm 230 of an actuator for moving the slider 210 along the x direction across the tracks of the magnetic disk platter 262. The actuator incorporates the arm 230 and a voice coil motor that drives the arm 230. A gimbal section for maintaining the orientation of the slider 210 is provided in the portion of the flexure 223 on which the slider 210 is mounted.

The head gimbal assembly 220 is attached to the arm 230 of the actuator. An assembly incorporating the arm 230 and the head gimbal assembly 220 attached to the arm 230 is called a head arm assembly. An assembly incorporating a carriage having a plurality of arms wherein the head gimbal assembly 220 is attached to each of the arms is called a head stack assembly.

FIG. 25 illustrates the head arm assembly of the embodiment. In the head arm assembly the head gimbal assembly 220 is attached to an end of the arm 230. A coil 231 that is part of the voice coil motor is fixed to the other end of the arm 230. A bearing 233 is provided in the middle of the arm 230. The bearing 233 is attached to a shaft 234 that rotatably supports the arm 230.

Figure 26:
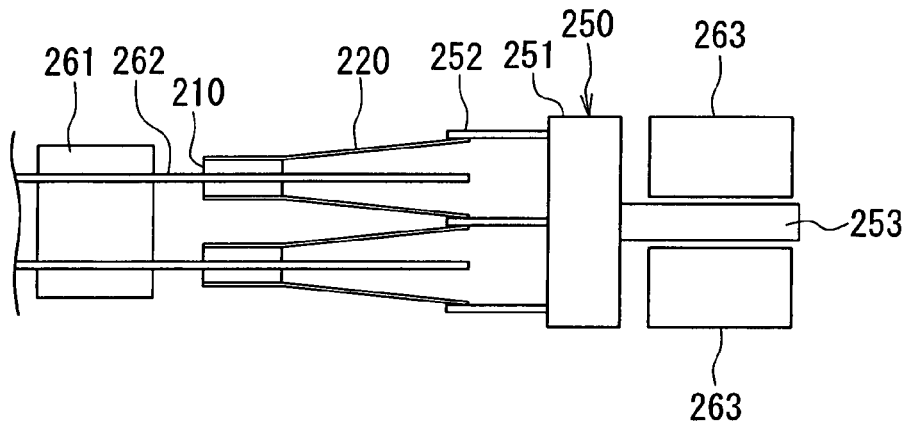
FIG. 26 is a view for illustrating a main part of a magnetic disk drive of the first embodiment of the invention.
Figure 27:
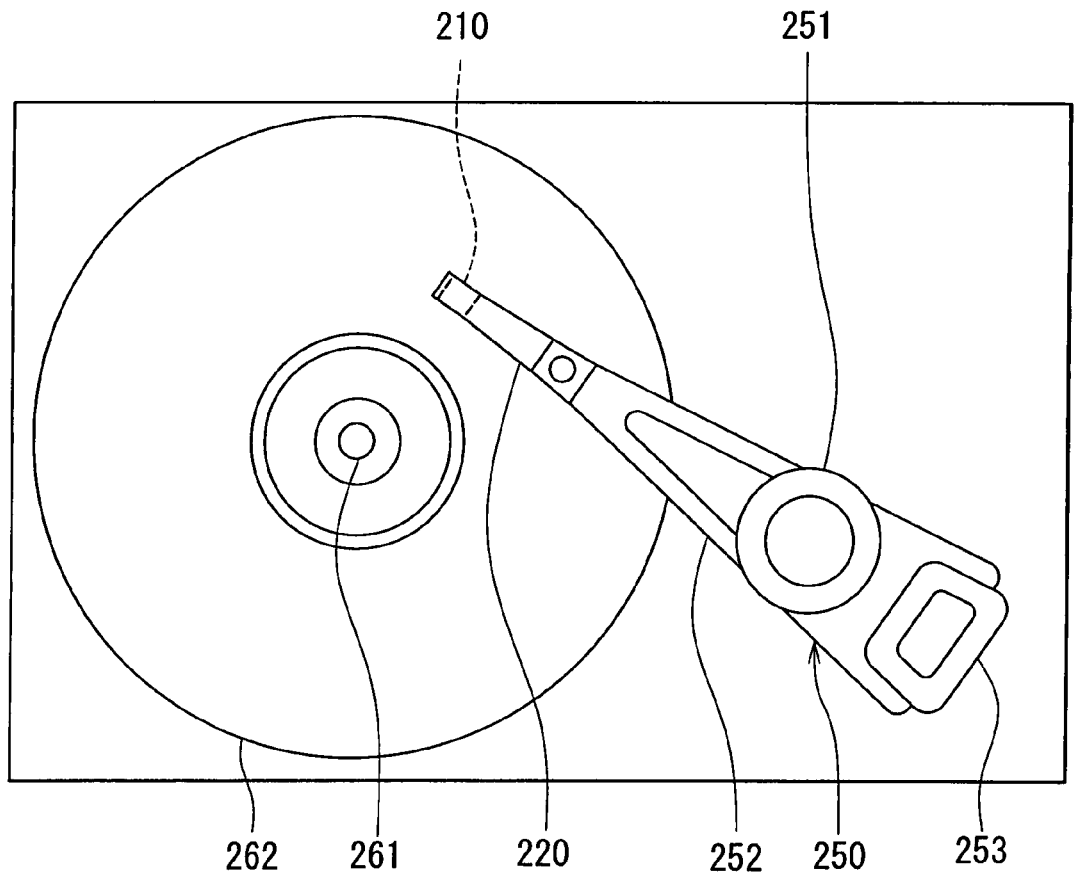
FIG. 27 is a top view of the magnetic disk drive of the first embodiment of the invention.

Reference is now made to FIG. 26 and FIG. 27 to describe an example of the head stack assembly and the magnetic disk drive of the embodiment. FIG. 26 illustrates the main part of the magnetic disk drive. FIG. 27 is a top view of the magnetic disk drive. The head stack assembly 250 incorporates a carriage 251 having a plurality of arms 252. A plurality of head gimbal assemblies 220 are attached to the arms 252 such that the assemblies 220 are arranged in the vertical direction with spacing between respective adjacent ones. A coil 253 that is part of the voice coil motor is mounted on the carriage 251 on a side opposite to the arms 252. The head stack assembly 250 is installed in the magnetic disk drive. The magnetic disk drive includes a plurality of magnetic disk platters 262 mounted on a spindle motor 261. Two of the sliders 210 are allocated to each of the platters 262, such that the two sliders 210 are opposed to each other with each of the platters 262 disposed in between. The voice coil motor includes permanent magnets 263 disposed to be opposed to each other, the coil 253 of the head stack assembly 250 being placed between the magnets 263.

The actuator and the head stack assembly 250 except the sliders 210 correspond to the alignment device of the invention, and support the sliders 210 and align them with respect to the magnetic disk platters 262.

In the magnetic disk drive of the embodiment, the actuator moves the slider 210 across the tracks of the magnetic disk platter 262 and aligns the slider 210 with respect to the magnetic disk platter 262. The magnetic head incorporated in the slider 210 writes data on the magnetic disk platter 262 by using the write head, and reads data stored on the magnetic disk platter 262 by using the read head.

The head assembly and the magnetic disk drive of the embodiment exhibit effects similar to those of the foregoing magnetic head of the embodiment.

Figure 28:
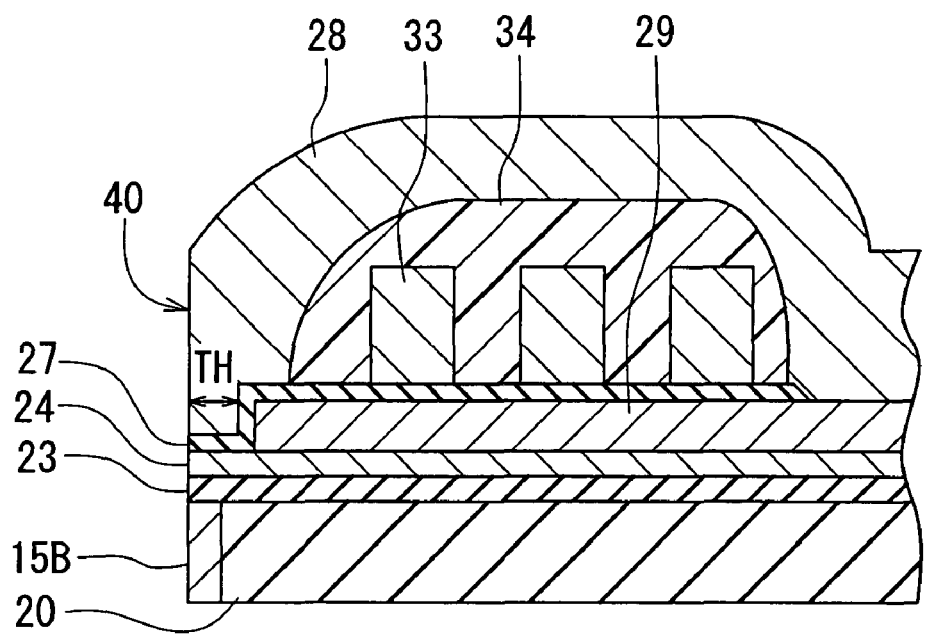
FIG. 28 is a cross-sectional view for illustrating the configuration of a magnetic head of a modification example of the first embodiment of the invention.

Reference is now made to FIG. 28 to describe a magnetic head of a modification example of the embodiment. FIG. 28 is a cross-sectional view for illustrating the configuration of the magnetic head of the modification example. In the modification example the second gap layer 27 is disposed on the pole layer 24 and the yoke layer 29. In the modification example the insulating layer 32 is not provided, and the coil 33 is disposed on a portion of the second gap layer 27 located on the yoke layer 29. In the modification example the second shield 28 is not divided into the first layer 28A and the second layer 28B, but is made up of a single layer. A portion of the second shield 28 is located between the medium facing surface 40 and the end face of the yoke layer 29 closer to the medium facing surface 40. This portion of the second shield 28 corresponds to the first layer 28A of the magnetic head of FIG. 1. This portion of the second shield 28 and the end face of the yoke layer 29 closer to the medium facing surface 40 are separated from each other by the second gap layer 27. Here, in a cross section that passes through the pole layer 24 and that is orthogonal to the medium facing surface 40 and the top surface of the substrate 1 as shown in FIG. 28, the length of the above-mentioned portion of the second shield 28 taken in the direction orthogonal to the medium facing surface 40 is called throat height TH. The size of the throat height TH has an influence on write characteristics. The remainder of configuration of the modification example is the same as that of the magnetic head of FIG. 1.

In a method of manufacturing the magnetic head of the modification example, after the pole layer 24 is formed in the step shown in FIG. 13, the yoke layer 29 is formed on the pole layer 24, and the connecting layer 30 is formed on the connecting layer 25. Next, the second gap layer 27 is formed on the entire top surface of the layered structure. Next, portions of the second gap layer 27 are etched by ion milling, for example, to form in the second gap layer 27 an opening for exposing a portion of the top surface of the yoke layer 29 near an end thereof farther from the medium facing surface 40, and an opening for exposing the top surface of the connecting layer 30. Next, the coil 33 and the insulating layer 34 are formed in this order. Next, the second shield 28 is formed. The remainder of steps of the method of manufacturing the magnetic head of the modification example are the same as those of the method of manufacturing the magnetic head of FIG. 1.

Figure 33:
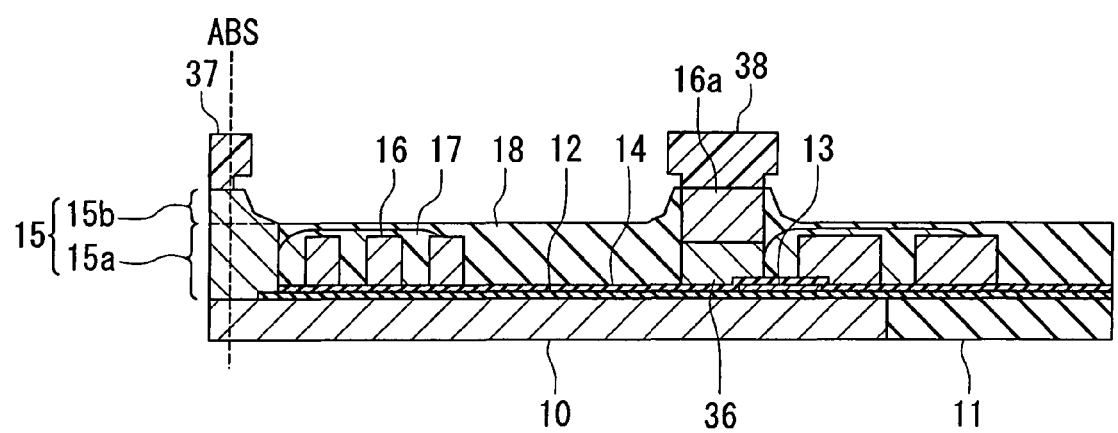
FIG. 33 is a cross-sectional view for illustrating a step that follows the step of FIG. 32.

In the method of manufacturing the magnetic head of the modification example, alumina is used as the material of the second gap layer 27, and the second gap layer 27 is formed by CVD or preferably by ALCVD. Through this method, it is possible to form the second gap layer 27 that exhibits an excellent step coverage on the surface with a difference in level as shown in FIG. 33. As a result, according to this method, it is possible to prevent the yoke layer 29 and the second shield 28 from touching each other in a neighborhood of the medium facing surface 40 and to control the throat height TH with precision. It is thereby possible to achieve stable write characteristics of the write head.

Figure 29:
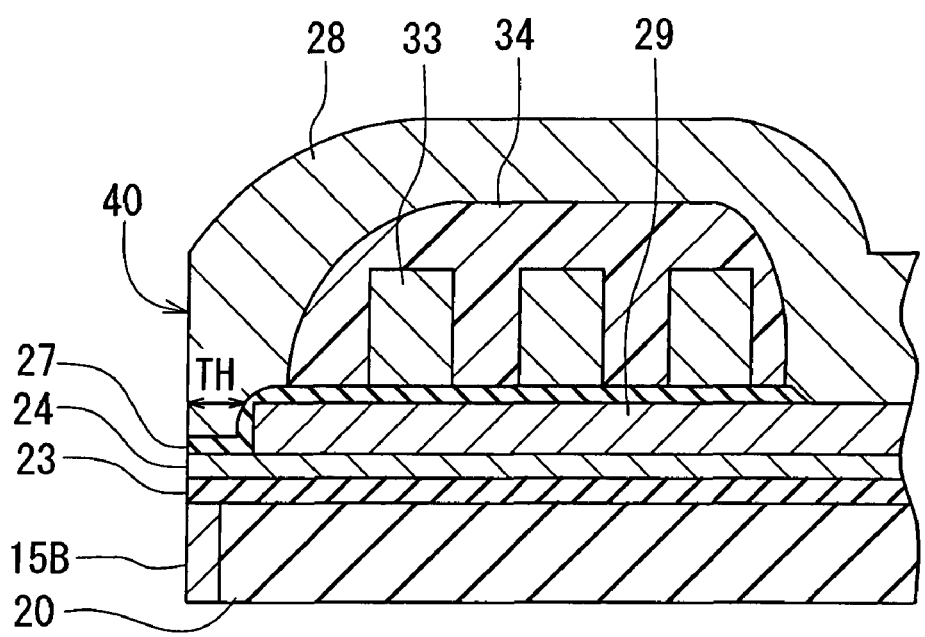
FIG. 29 is a cross-sectional view for illustrating the configuration of a magnetic head of a reference example for comparison with the magnetic head of FIG. 28.

FIG. 29 is a cross-sectional view for illustrating the configuration of a magnetic head of a reference example for comparison with the magnetic head of FIG. 28. The configuration of the magnetic head of FIG. 29 is the same as that of the magnetic head of FIG. 28 except that the second gap layer 27 is formed by sputtering. In this reference example, the step coverage of the second gap layer 27 is poor, and there is a possibility that the yoke layer 29 and the second shield 28 may touch each other, and it is difficult to control the throat height TH with precision. Consequently, in the reference example, there may occur a case in which write characteristics of the write head are greatly degraded.

Second Embodiment

Figure 30:
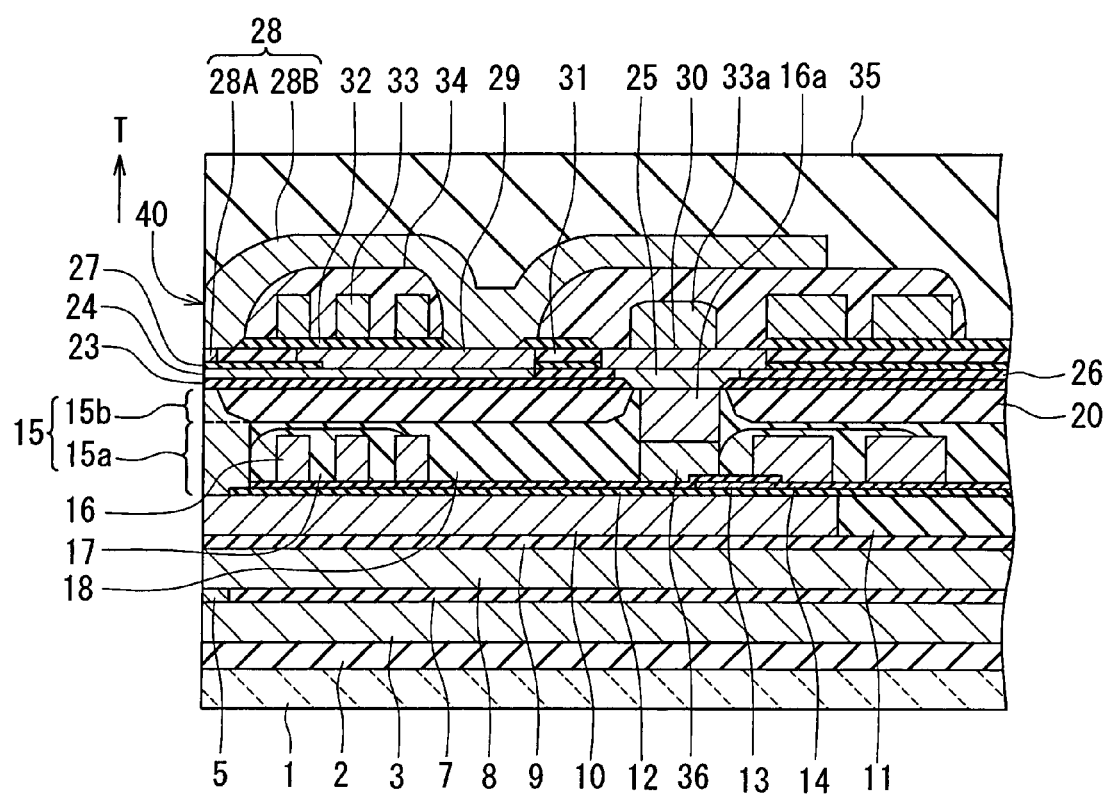
FIG. 30 is a cross-sectional view for illustrating the configuration of a magnetic head of a second embodiment of the invention.

A second embodiment of the invention will now be described. Reference is now made to FIG. 30 to describe the configuration of a magnetic head of the second embodiment. FIG. 30 is a cross-sectional view for illustrating the configuration of the magnetic head. FIG. 30 illustrates a cross section orthogonal to the medium facing surface and the top surface of the substrate. The arrow indicated with T in FIG. 30 shows the direction of travel of the recording medium.

In the second embodiment, the first shield 15 is made up of a single layer disposed on the magnetic layer 10. The first shield 15 of the second embodiment includes: a first portion 15a disposed on the magnetic layer 10; and a second portion 15b disposed between the first portion 15a and the first gap layer 23. The length of the first portion 15a taken in the direction orthogonal to the medium facing surface 40 is uniform. The length of the second portion 15b taken in the direction orthogonal to the medium facing surface 40 is smaller than the length of the first portion 15a taken in the direction orthogonal to the medium facing surface 40.

An end face of the second portion 15b farther from the medium facing surface 40 may be a surface orthogonal to the top surface of the substrate 1, or may be a surface tilted with respect to the direction orthogonal to the top surface of the substrate 1. In the example shown in FIG. 30, the end face of the second portion 15b farther from the medium facing surface 40 forms a surface that is tilted with respect to the direction orthogonal to the top surface of the substrate 1 and that bends somewhere in a middle thereof. In this example the length of the second portion 15b taken in the direction orthogonal to the medium facing surface 40 increases with decreasing distance from the top surface of the substrate 1. In this example a flat surface touching the first gap layer 23 is formed at an upper end of the second portion 15b.

In the second embodiment a raising layer 36 is formed between the connecting portion 16a of the coil 16 and the insulating film 14. The material of the raising layer 36 may be an insulating material or a conductive material. In the second embodiment the connecting layer 19 of the first embodiment is not provided, and the connecting layer 25 is disposed on the connecting portion 16a.

Reference is now made to FIG. 31 to FIG. 35 to describe a method of manufacturing the magnetic head of the second embodiment. The method of the second embodiment includes the steps up to the step of forming the insulating film 14, as shown in FIG. 4, that are the same as those of the first embodiment.

Figure 31:
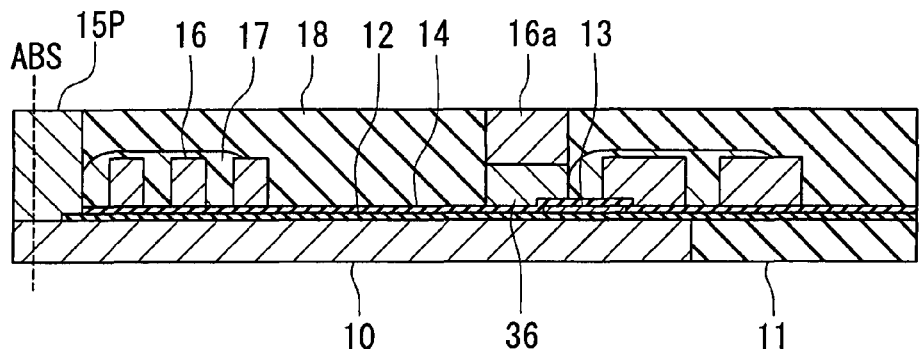
FIG. 31 is a cross-sectional view for illustrating a step of a method of manufacturing the magnetic head of the second embodiment of the invention.

FIG. 31 illustrates the following step. In the step, first, the raising layer 36 is formed on the insulating film 14. Next, a layer for shield 15P, which is to become the first shield 15 later by undergoing partial etching, is formed on the magnetic layer 10 by frame plating, for example. Next, the coil 16 is formed by frame plating, for example. Of the coil 16 the connecting portion 16a is disposed on the raising layer 36 while the other portion is disposed on the insulating film 14. Next, the insulating layer 17 is formed such that the space between the coil 16 and the layer for shield 15P and the space between respective adjacent turns of the coil 16 are filled with the insulating layer 17. Next, the insulating layer 18 is formed on the entire top surface of the layered structure. Next, the insulating layer 18 is polished by CMP, for example, so that the layer for shield 15P and the connecting portion 16a are exposed, and the top surfaces of the layer for shield 15P, the connecting portion 16a and the insulating layer 18 are thereby flattened.

Figure 32:
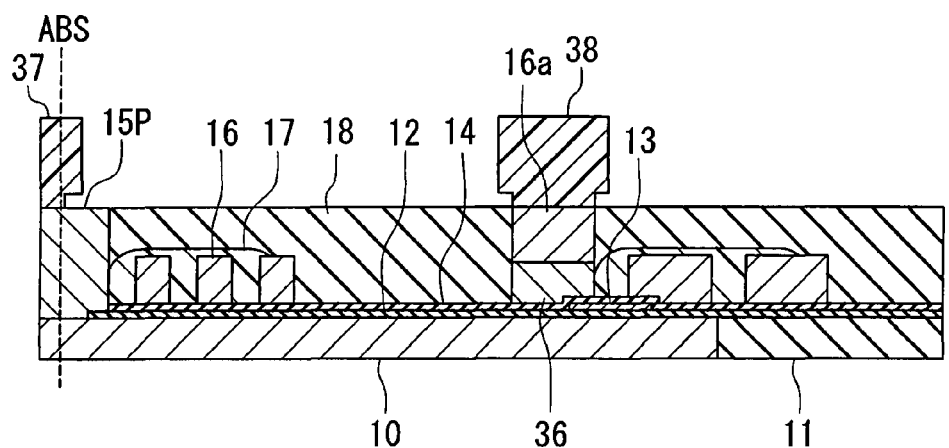
FIG. 32 is a cross-sectional view for illustrating a step that follows the step of FIG. 31.

Next, as shown in FIG. 32, masks 37 and 38 are formed by patterning a photoresist layer by photolithography, for example. The mask 37 is disposed on a portion of the top surface of the layer for shield 15P. The mask 38 is disposed on the top surface of the connecting portion 16a.

Next, as shown in FIG. 33, a portion of the layer for shield 15P and a portion of the insulating layer 18 are etched by ion milling or reactive ion etching, for example. Through this etching, the first portion 15a and the second portion 15b are formed in the layer for shield 15P, and the layer for shield 15P thereby becomes the first shield 15. In this step, the connecting portion 16a is not etched since it is protected with the mask 38.

Figure 34:
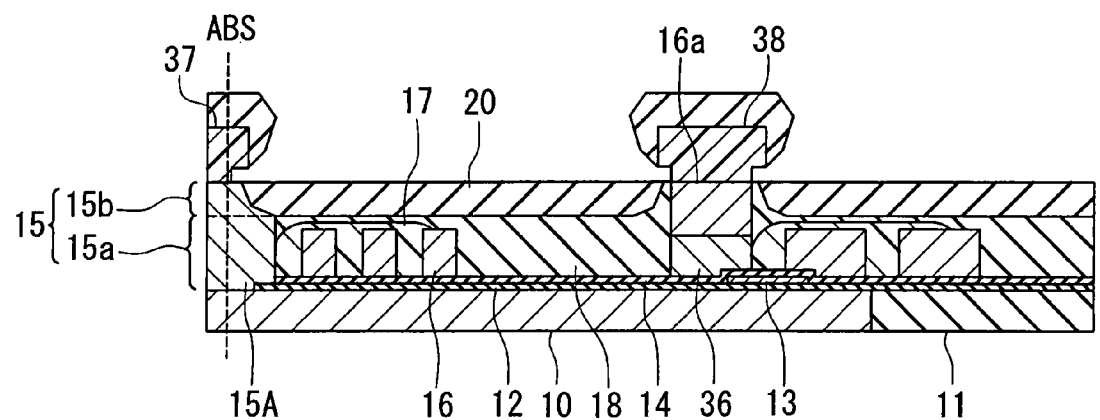
FIG. 34 is a cross-sectional view for illustrating a step that follows the step of FIG. 33.

Next, as shown in FIG. 34, the insulating layer 20 is formed on the entire top surface of the layered structure with the masks 37 and 38 left unremoved. In this step the insulating layer 20 is formed such that the level at which the top surface of the insulating layer 20 is located nearly coincides with the level at which the top surfaces of the first shield 15 and the connecting portion 16a are located. The top surfaces of the first shield 15, the connecting portion 16a and the insulating layer 20 are thereby made nearly flat.

Figure 35:
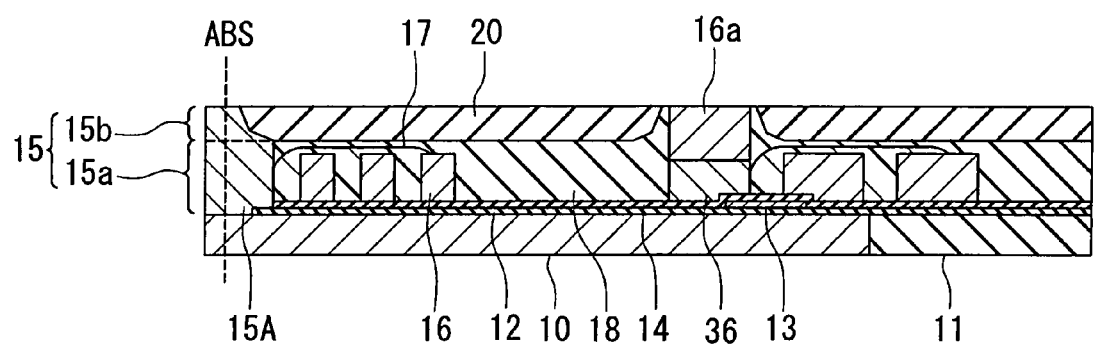
FIG. 35 is a cross-sectional view for illustrating a step that follows the step of FIG. 34.

Next, as shown in FIG. 35, the masks 37 and 38 are removed. Here, if the flatness of the top surfaces of the first shield 15, the connecting portion 16a and the insulating layer 20 is insufficient, these top surfaces may be slightly polished by CMP, for example, to flatten these top surfaces. Since the amount of polishing required here is slight, the effect of this polishing on the precision of the shape of the first shield 15 is small.

The following steps of the second embodiment are the same as the steps of the first embodiment described with reference to FIG. 11 to FIG. 20.

In the second embodiment, the first shield 15 includes the first portion 15a disposed on the magnetic layer 10, and the second portion 15b disposed between the first portion 15a and the first gap layer 23. The length of the second portion 15b taken in the direction orthogonal to the medium facing surface 40 is smaller than the length of the first portion 15a taken in the direction orthogonal to the medium facing surface 40. The second portion 15b is formed by etching a portion of the layer for shield 15P closer to the top surface thereof. According to the second embodiment, it is possible to precisely control the shape of the second portion 15b of the first shield 15 that has a greater effect on the write characteristics in particular. As a result, the embodiment allows the function of the first shield 15 to be effectively exerted and makes it possible to control the write characteristics with precision.

Figure 36:
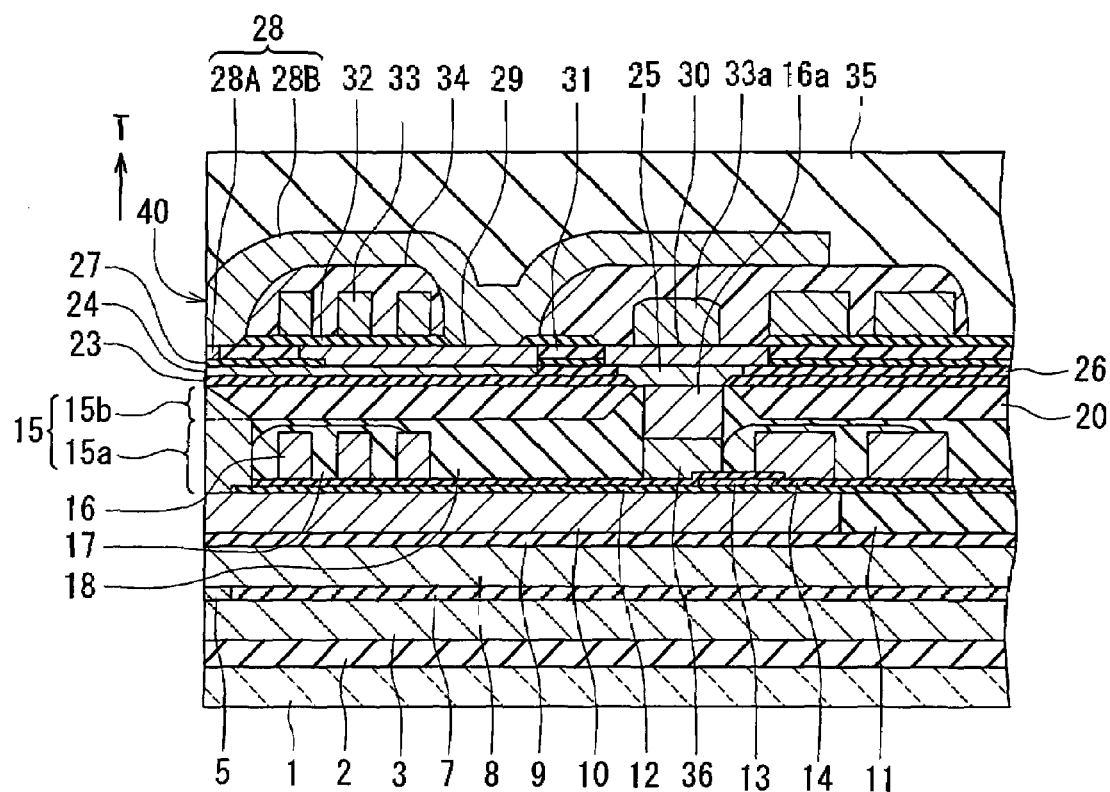
FIG. 36 is a cross-sectional view for illustrating the configuration of a magnetic head of a modification example of the second embodiment of the invention.

Reference is now made to FIG. 36 to describe a magnetic head of a modification example of the second embodiment. FIG. 36 is a cross-sectional view for illustrating the configuration of the magnetic head of the modification example. In the modification example, the shape of the second portion 15b of the first shield 15 in the cross section of FIG. 36 is triangular. The length of the second portion 15b taken in the direction orthogonal to the medium facing surface 40 increases with decreasing distance from the top surface of the substrate 1. In this modification example the edge of an upper end of the second portion 15b touches the first gap layer 23.

The remainder of configuration, operation and effects of the second embodiment are similar to those of the first embodiment.

The present invention is not limited to the foregoing embodiments but may be practiced in still other ways. For example, the first shield 15 may include three or more layers.

While the magnetic head disclosed in the embodiments has such a configuration that the read head is formed on the base body and the write head is stacked on the read head, it is also possible that the read head is stacked on the write head.

Obviously many modifications and variations of the present invention are possible in the light of the above teachings. It is therefore to be understood that within the scope of the appended claims the invention may be practiced otherwise than as specifically described.

What is claimed is:

1. A magnetic head for perpendicular magnetic recording comprising:

a medium facing surface that faces toward a recording medium;

a coil that generates a magnetic field corresponding to data to be written on the recording medium;

a pole layer that has an end face located in the medium facing surface, allows a magnetic flux corresponding to the magnetic field generated by the coil to pass therethrough and generates a write magnetic field for writing the data on the recording medium by means of a perpendicular magnetic recording system;

a first shield made of a magnetic material and having an end face located in the medium facing surface at a position backward of the end face of the pole layer along a direction of travel of the recording medium;

a first gap layer made of a nonmagnetic material and having an end face located in the medium facing surface, the first gap layer being disposed between the first shield and the pole layer;

a magnetic layer connected to the first shield and disposed at such a position that the first shield is sandwiched between the magnetic layer and the pole layer;

a second shield made of a magnetic material and having an end face located in the medium facing surface at a position forward of the end face of the pole layer along the direction of travel of the recording medium;

a second gap layer made of a nonmagnetic material and having an end face located in the medium facing surface, the second gap layer being disposed between the second shield and the pole layer; and a substrate on which the coil, the pole layer, the magnetic layer, the first and second shields, and the first and second gap layers are stacked, the first shield being located closer to the substrate than the second shield, wherein:

the first shield includes a first layer, and a second layer that is disposed between the first layer and the first gap layer;

a length of the magnetic layer taken in a direction orthogonal to the medium facing surface is greater than a length of the pole layer taken in the direction orthogonal to the medium facing surface;

a length of the first layer taken in the direction orthogonal to the medium facing surface is smaller than the length of the pole layer taken in the direction orthogonal to the medium facing surface; and in the medium facing surface, both the first layer and the second layer have a width greater than a width of the pole layer.

2. The magnetic head for perpendicular magnetic recording according to claim 1, wherein a length of the second layer taken in a direction orthogonal to the medium facing surface is smaller than a length of the first layer taken in the direction orthogonal to the medium facing surface.

3. The magnetic head for perpendicular magnetic recording according to claim 1, wherein: the second shield is connected to the pole layer at a position away from the medium facing surface; and the coil includes a portion that passes through a space surrounded by the pole layer and the second shield.

4. The magnetic head according to claim 3, wherein the coil further includes a portion that passes through a space between the magnetic layer and the pole layer.

5. A head assembly comprising: a slider including a magnetic head for perpendicular magnetic recording and disposed to face toward a recording medium; and a supporter flexibly supporting the slider, the magnetic head comprising:

a medium facing surface that faces toward a recording medium;

a coil that generates a magnetic field corresponding to data to be written on the recording medium;

a pole layer that has an end face located in the medium facing surface, allows a magnetic flux corresponding to the magnetic field generated by the coil to pass therethrough and generates a write magnetic field for writing the data on the recording medium by means of a perpendicular magnetic recording system;

a first shield made of a magnetic material and having an end face located in the medium facing surface at a position backward of the end face of the pole layer along a direction of travel of the recording medium;

a first gap layer made of a nonmagnetic material and having an end face located in the medium facing surface, the first gap layer being disposed between the first shield and the pole layer;

a magnetic layer connected to the first shield and disposed at such a position that the first shield is sandwiched between the magnetic layer and the pole layer;

a second shield made of a magnetic material and having an end face located in the medium facing surface at a position forward of the end face of the pole layer along the direction of travel of the recording medium;

a second gap layer made of a nonmagnetic material and having an end face located in the medium facing surface, the second gap layer being disposed between the second shield and the pole layer; and a substrate on which the coil, the pole layer, the magnetic layer, the first and second shields, and the first and second gap layers are stacked, wherein:

the first shield is located closer to the substrate than the second shield;

the first shield includes a first layer, and a second layer that is disposed between the first layer and the first gap layer;

a length of the magnetic layer taken in a direction orthogonal to the medium facing surface is greater than a length of the pole layer taken in the direction orthogonal to the medium facing surface;

a length of the first layer taken in the direction orthogonal to the medium facing surface is smaller than the length of the pole layer taken in the direction orthogonal to the medium facing surface; and in the medium facing surface, both the first layer and the second layer have a width greater than a width of the pole layer.

6. A magnetic disk drive comprising: a slider including a magnetic head for perpendicular magnetic recording and disposed to face toward a recording medium that is driven to rotate; and an alignment device supporting the slider and aligning the slider with respect to the recording medium, the magnetic head comprising:

a medium facing surface that faces toward a recording medium;

a coil that generates a magnetic field corresponding to data to be written on the recording medium;

a pole layer that has an end face located in the medium facing surface, allows a magnetic flux corresponding to the magnetic field generated by the coil to pass therethrough and generates a write magnetic field for writing the data on the recording medium by means of a perpendicular magnetic recording system;

a first shield made of a magnetic material and having an end face located in the medium facing surface at a position backward of the end face of the pole layer along a direction of travel of the recording medium;

a first gap layer made of a nonmagnetic material and having an end face located in the medium facing surface, the first gap layer being disposed between the first shield and the pole layer;

a magnetic layer connected to the first shield and disposed at such a position that the first shield is sandwiched between the magnetic layer and the pole layer;

a second shield made of a magnetic material and having an end face located in the medium facing surface at a position forward of the end face of the pole layer along the direction of travel of the recording medium;

a second gap layer made of a nonmagnetic material and having an end face located in the medium facing surface, the second gap layer being disposed between the second shield and the pole layer; and a substrate on which the coil, the pole layer, the magnetic layer, the first and second shields, and the first and second gap layers are stacked, wherein:

the first shield is located closer to the substrate than the second shield;

the first shield includes a first layer, and a second layer that is disposed between the first layer and the first gap layer;

a length of the magnetic layer taken in a direction orthogonal to the medium facing surface is greater than a length of the pole layer taken in the direction orthogonal to the medium facing surface;

a length of the first layer taken in the direction orthogonal to the medium facing surface is smaller than the length of the pole layer taken in the direction orthogonal to the medium facing surface; and in the medium facing surface, both the first layer and the second layer have a width greater than a width of the pole layer.

7. A method of manufacturing a magnetic head for perpendicular magnetic recording, the magnetic head comprising:

a medium facing surface that faces toward a recording medium;

a coil that generates a magnetic field corresponding to data to be written on the recording medium;

a pole layer that has an end face located in the medium facing surface, allows a magnetic flux corresponding to the magnetic field generated by the coil to pass therethrough and generates a write magnetic field for writing the data on the recording medium by means of a perpendicular magnetic recording system;

a first shield made of a magnetic material and having an end face located in the medium facing surface at a position backward of the end face of the pole layer along a direction of travel of the recording medium;

a first gap layer made of a nonmagnetic material and having an end face located in the medium facing surface, the first gap layer being disposed between the first shield and the pole layer;

a magnetic layer connected to the first shield and disposed at such a position that the first shield is sandwiched between the magnetic layer and the pole layer;

a second shield made of a magnetic material and having an end face located in the medium facing surface at a position forward of the end face of the pole layer along the direction of travel of the recording medium; and a second gap layer made of a nonmagnetic material and having an end face located in the medium facing surface, the second gap layer being disposed between the second shield and the pole layer; and a substrate on which the coil, the pole layer, the magnetic layer, the first and second shields, and the first and second gap layers are stacked, the first shield being located closer to the substrate than the second shield, wherein:

the first shield includes a first layer, and a second layer that is disposed between the first layer and the first gap layer;

a length of the magnetic layer taken in a direction orthogonal to the medium facing surface is greater than a length of the pole layer taken in the direction orthogonal to the medium facing surface;

a length of the first layer taken in the direction orthogonal to the medium facing surface is smaller than the length of the pole layer taken in the direction orthogonal to the medium facing surface; and in the medium facing surface, both the first layer and the second layer have a width greater than a width of the pole layer, the method comprising the steps of:

forming the magnetic layer;

forming the first shield after the magnetic layer is formed;

forming the first gap layer after the first shield is formed;

forming the pole layer after the first gap layer is formed;

forming the second gap layer after the pole layer is formed;

forming the second shield after the second gap layer is formed; and forming the coil, wherein the step of forming the first shield includes the step of forming the first layer and the step of forming the second layer on the first layer by frame plating.

8. A magnetic head for perpendicular magnetic recording comprising:

a medium facing surface that faces toward a recording medium;

a coil that generates a magnetic field corresponding to data to be written on the recording medium;

a pole layer that has an end face located in the medium facing surface, allows a magnetic flux corresponding to the magnetic field generated by the coil to pass therethrough and generates a write magnetic field for writing the data on the recording medium by means of a perpendicular magnetic recording system;

a first shield made of a magnetic material and having an end face located in the medium facing surface at a position backward of the end face of the pole layer along a direction of travel of the recording medium;

a first gap layer made of a nonmagnetic material and having an end face located in the medium facing surface, the first gap layer being disposed between the first shield and the pole layer;

a magnetic layer connected to the first shield and disposed at such a position that the first shield is sandwiched between the magnetic layer and the pole layer;

a second shield made of a magnetic material and having an end face located in the medium facing surface at a position forward of the end face of the pole layer along the direction of travel of the recording medium;

a second gap layer made of a nonmagnetic material and having an end face located in the medium facing surface, the second gap layer being disposed between the second shield and the pole layer; and a substrate on which the coil, the pole layer, the magnetic layer, the first and second shields, and the first and second gap layers are stacked, the first shield being located closer to the substrate than the second shield, wherein:

the first shield includes a first portion, and a second portion that is disposed between the first portion and the first gap layer;

a length of the magnetic layer taken in a direction orthogonal to the medium facing surface is greater than a length of the pole layer taken in the direction orthogonal to the medium facing surface;

a length of the first portion taken in the direction orthogonal to the medium facing surface is smaller than the length of the pole layer taken in the direction orthogonal to the medium facing surface;

a length of the second portion taken in the direction orthogonal to the medium facing surface is smaller than the length of the first portion taken in the direction orthogonal to the medium facing surface; and in the medium facing surface, both the first portion and the second portion have a width greater than a width of the pole layer.

9. The magnetic head for perpendicular magnetic recording according to claim 8, wherein: the second shield is connected to the pole layer at a position away from the medium facing surface; and the coil includes a portion that passes through a space surrounded by the pole layer and the second shield.

10. The magnetic head for perpendicular magnetic recording according to claim 9, wherein the coil further includes a portion that passes through a space between the magnetic layer and the pole layer.

11. A head assembly comprising: a slider including a magnetic head for perpendicular magnetic recording and disposed to face toward a recording medium; and a supporter flexibly supporting the slider, the magnetic head comprising:

a medium facing surface that faces toward a recording medium;

a coil that generates a magnetic field corresponding to data to be written on the recording medium;

a pole layer that has an end face located in the medium facing surface, allows a magnetic flux corresponding to the magnetic field generated by the coil to pass therethrough and generates a write magnetic field for writing the data on the recording medium by means of a perpendicular magnetic recording system;

a first shield made of a magnetic material and having an end face located in the medium facing surface at a position backward of the end face of the pole layer along a direction of travel of the recording medium;

a first gap layer made of a nonmagnetic material and having an end face located in the medium facing surface, the first gap layer being disposed between the first shield and the pole layer;

a magnetic layer connected to the first shield and disposed at such a position that the first shield is sandwiched between the magnetic layer and the pole layer;

a second shield made of a magnetic material and having an end face located in the medium facing surface at a position forward of the end face of the pole layer along the direction of travel of the recording medium;

a second gap layer made of a nonmagnetic material and having an end face located in the medium facing surface, the second gap layer being disposed between the second shield and the pole layer; and a substrate on which the coil, the pole layer, the magnetic layer, the first and second shields, and the first and second gap layers are stacked, wherein:

the first shield is located closer to the substrate than the second shield;

the first shield includes a first portion, and a second portion that is disposed between the first portion and the first gap layer;

a length of the magnetic layer taken in a direction orthogonal to the medium facing surface is greater than a length of the pole layer taken in the direction orthogonal to the medium facing surface;

a length of the first portion taken in the direction orthogonal to the medium facing surface is smaller than the length of the pole layer taken in the direction orthogonal to the medium facing surface;

a length of the second portion taken in the direction orthogonal to the medium facing surface is smaller than the length of the first portion taken in the direction orthogonal to the medium facing surface; and in the medium facing surface, both the first portion and the second portion have a width greater than a width of the pole layer.

12. A magnetic disk drive comprising: a slider including a magnetic head for perpendicular magnetic recording and disposed to face toward a recording medium that is driven to rotate; and an alignment device supporting the slider and aligning the slider with respect to the recording medium, the magnetic head comprising:

a medium facing surface that faces toward a recording medium;

a coil that generates a magnetic field corresponding to data to be written on the recording medium;

a pole layer that has an end face located in the medium facing surface, allows a magnetic flux corresponding to the magnetic field generated by the coil to pass therethrough and generates a write magnetic field for writing the data on the recording medium by means of a perpendicular magnetic recording system;

a first shield made of a magnetic material and having an end face located in the medium facing surface at a position backward of the end face of the pole layer along a direction of travel of the recording medium;

a first gap layer made of a nonmagnetic material and having an end face located in the medium facing surface, the first gap layer being disposed between the first shield and the pole layer;

a magnetic layer connected to the first shield and disposed at such a position that the first shield is sandwiched between the magnetic layer and the pole layer;

a second shield made of a magnetic material and having an end face located in the medium facing surface at a position forward of the end face of the pole layer along the direction of travel of the recording medium; and a second gap layer made of a nonmagnetic material and having an end face located in the medium facing surface, the second gap layer being disposed between, the second shield and the pole layer; and a substrate on which the coil, the pole layer, the magnetic layer, the first and second shields, and the first and second gap layers are stacked, wherein:

the first shield is located closer to the substrate than the second shield;

the first shield includes a first portion, and a second portion that is disposed between the first portion and the first gap layer;

a length of the magnetic layer taken in a direction orthogonal to the medium facing surface is greater than a length of the pole layer taken in the direction orthogonal to the medium facing surface;

a length of the first portion taken in the direction orthogonal to the medium facing surface is smaller than the length of the pole layer taken in the direction orthogonal to the medium facing surface;

a length of the second portion taken in the direction orthogonal to the medium facing surface is smaller than the length of the first portion taken in the direction orthogonal to the medium facing surface; and in the medium facing surface, both the first portion and the second portion have a width greater than a width of the pole layer.

13. A method of manufacturing a magnetic head for perpendicular magnetic recording, the magnetic head comprising:

a medium facing surface that faces toward a recording medium;

a coil that generates a magnetic field corresponding to data to be written on the recording medium;

a pole layer that has an end face located in the medium facing surface, allows a magnetic flux corresponding to the magnetic field generated by the coil to pass therethrough and generates a write magnetic field for writing the data on the recording medium by means of a perpendicular magnetic recording system;

a first shield made of a magnetic material and having an end face located in the medium facing surface at a position backward of the end face of the pole layer along a direction of travel of the recording medium;

a first gap layer made of a nonmagnetic material and having an end face located in the medium facing surface, the first gap layer being disposed between the first shield and the pole layer;

a magnetic layer connected to the first shield and disposed at such a position that the first shield is sandwiched between the magnetic layer and the pole layer;

a second shield made of a magnetic material and having an end face located in the medium facing surface at a position forward of the end face of the pole layer along the direction of travel of the recording medium; and a second gap layer made of a nonmagnetic material and having an end face located in the medium facing surface, the second gap layer being disposed between the second shield and the pole layer; and a substrate on which the coil, the pole layer, the magnetic layer, the first and second shields, and the first and second gap layers are stacked, the first shield being located closer to the substrate than the second shield, wherein:

the first shield includes a first portion, and a second portion that is disposed between the first portion and the first gap layer;

a length of the magnetic layer taken in a direction orthogonal to the medium facing surface is greater than a length of the pole layer taken in the direction orthogonal to the medium facing surface;

a length of the first portion taken in the direction orthogonal to the medium facing surface is smaller than the length of the pole layer taken in the direction orthogonal to the medium facing surface;

a length of the second portion taken in the direction orthogonal to the medium facing surface is smaller than the length of the first portion taken in the direction orthogonal to the medium facing surface; and in the medium facing surface, both the first portion and the second portion have a width greater than a width of the pole layer, the method comprising the steps of:

forming the magnetic layer;

forming the first shield after the magnetic layer is formed;

forming the first gap layer after the first shield is formed;

forming the pole layer after the first gap layer is formed;

forming the second gap layer after the pole layer is formed;

forming the second shield after the second gap layer is formed; and forming the coil, wherein the step of forming the first shield includes the steps of:

forming a shield layer that is to become the first shield later by undergoing partial etching; and forming the first and second portions by partially etching the shield layer.

* * * * *